United States Patent
Wichelman et al.

(10) Patent No.: US 7,779,368 B2
(45) Date of Patent: Aug. 17, 2010

(54) SYSTEMS AND METHODS FOR PRESENTING MANAGED DATA

(75) Inventors: James Wichelman, Fort Collins, CO (US); Peter M. Maddocks, Windsor, CO (US); Mark Mills, Fort Collins, CO (US); Gary L. Thunquest, Berthoud, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 857 days.

(21) Appl. No.: 10/978,171

(22) Filed: Oct. 30, 2004

(65) Prior Publication Data

US 2006/0095664 A1 May 4, 2006

(51) Int. Cl.
*G06F 3/048* (2006.01)
*G06F 3/00* (2006.01)

(52) U.S. Cl. .............. 715/833; 715/734; 715/735; 715/736; 715/771; 711/114; 711/173; 703/22; 703/25

(58) Field of Classification Search ........ 715/771–772, 715/853, 855, 732–738, 781, 835, 113, 114, 715/173, 810; 711/114, 113, 173; 703/17, 703/20–22, 24–25
See application file for complete search history.

(56) References Cited

U.S. PATENT DOCUMENTS

| | | | |
|---|---|---|---|
| 5,581,797 A * | 12/1996 | Baker et al. | 715/708 |
| 5,596,736 A * | 1/1997 | Kerns | 711/4 |
| 5,960,451 A * | 9/1999 | Voigt et al. | 711/114 |
| 6,346,954 B1 * | 2/2002 | Chu et al. | 715/764 |
| 6,396,516 B1 * | 5/2002 | Beatty | 715/764 |
| 6,519,679 B2 * | 2/2003 | Devireddy et al. | 711/114 |
| 6,664,978 B1 * | 12/2003 | Kekic et al. | 715/733 |
| 6,802,022 B1 * | 10/2004 | Olson | 714/6 |
| 6,842,823 B1 * | 1/2005 | Olson | 711/129 |
| 6,922,816 B1 * | 7/2005 | Amin et al. | 715/833 |
| 6,944,183 B1 * | 9/2005 | Iyer et al. | 370/466 |
| 7,017,023 B1 * | 3/2006 | Knight | 711/170 |
| 7,099,947 B1 * | 8/2006 | Nadeau et al. | 709/229 |
| 7,107,534 B1 * | 9/2006 | de Jong et al. | 715/734 |
| 7,139,823 B2 * | 11/2006 | Benfield et al. | 709/224 |
| 7,152,142 B1 * | 12/2006 | Guha et al. | 711/114 |
| 7,225,244 B2 * | 5/2007 | Reynolds et al. | 709/223 |
| 7,356,770 B1 * | 4/2008 | Jackson | 715/736 |
| 2004/0001095 A1 * | 1/2004 | Marques | 345/771 |
| 2004/0025162 A1 * | 2/2004 | Fisk | 718/105 |
| 2004/0075690 A1 * | 4/2004 | Cirne | 345/771 |
| 2005/0050471 A1 * | 3/2005 | Hallisey et al. | 715/734 |
| 2006/0095705 A1 * | 5/2006 | Wichelman et al. | 711/171 |

\* cited by examiner

*Primary Examiner*—Ba Huynh
*Assistant Examiner*—Nicholas Augustine

(57) ABSTRACT

Systems and methods for presenting managed data from one or more applications are invented and disclosed. A data storage management system comprises a data store, a data storage manager, and a graphical user interface. The data storage manager is communicatively coupled to the data store and configured to allocate and use logical and physical storage elements of the data store via an application instance. The graphical user interface exposes data storage in application specific storage units. A method for managing data comprises coupling a data store to one or more applications, allocating storage on the data store in accordance with respective storage requirements expressed as an application instance associated with each of the one or more applications, and using a graphical user interface to expose the data store in application storage units associated with the one or more applications.

39 Claims, 14 Drawing Sheets

SYSTEMS AND METHODS FOR
PRESENTING MANAGED DATA

BACKGROUND

Systems and methods for data storage management have long been recognized in the computing arts. Traditionally, data storage management has included volatile and non-volatile memory devices ranging from registers to flash memory devices. For some time now, operating systems have been configured to manage data organized hierarchically under a logical device. More recently, schemes have been developed and implemented to manage arrays of logical devices such as a redundant array of inexpensive disks more commonly known as RAID. These arrays of inexpensive disks can be arranged and used to ensure various levels of data integrity even when a RAID suffers a failure of one of the disks.

Applications, however, are configured to allocate, use, and manage these and other data storage devices in a myriad of various ways. Some individual applications are configured with documentation and/or help menus to assist administrators determine the amount of raw data storage needed to operate the application. Many of these application specific data storage schemes require a system administrator to be aware of any number of details which have no direct relationship to the storage needs of the application being deployed on the system. These and other data storage implementations require system administrators to know storage components and data abstractions from a physical storage perspective and in terms specific to the various applications deployed across a system.

Thus, a heretofore-unaddressed need exists to provide improvements to systems and methods for managing data storage that addresses the aforementioned deficiencies and inadequacies.

SUMMARY

One embodiment of a data storage management system comprises a data store, a data storage manager, and a graphical user interface. The data storage manager is communicatively coupled to the data store and configured to allocate and use logical and physical storage elements of the data store via an application instance that defines a set of areas within the data store that are used by an application specific storage solution. The graphical user interface exposes data storage in the data store in application specific storage units.

Another embodiment describes a method for presenting managed data. The method comprises coupling a data store to one or more applications, allocating storage on the data store in accordance with respective storage requirements expressed as an application instance associated with each of the one or more applications, and using a graphical user interface to expose the data store in application storage units associated with the one or more applications, the graphical user interface comprising a representation illustrating data store allocation and usage across one or more applications.

BRIEF DESCRIPTION OF THE DRAWINGS

The present systems and methods for presenting managed data, as defined in the claims, can be better understood with reference to the following drawings. The components within the drawings are not necessarily to scale relative to each other, emphasis instead is placed upon clearly illustrating the principles of the systems and methods for presenting managed data.

DETAILED DESCRIPTION

Figure 1:
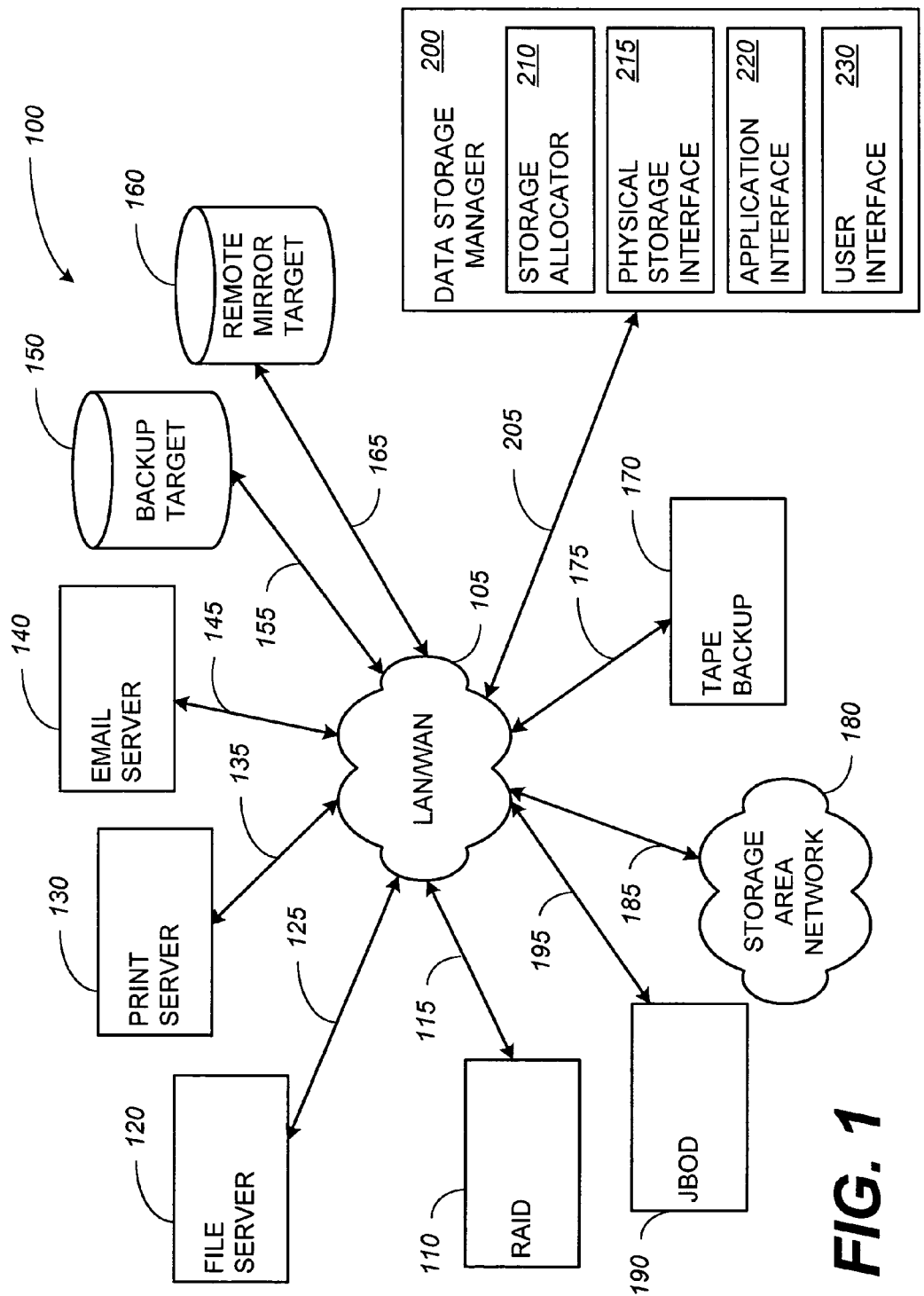
FIG. 1 is a diagram illustrating an embodiment of an operating environment that includes a data storage management system.

The systems and methods for data storage management simplify and automate the management of data storage. Stored data is managed from an application perspective in addition to raw storage units thereby allowing administrators to focus on what is important to their respective businesses. The systems and methods for data storage management integrate application specific storage solutions with data storage management techniques to produce a tool, which guides a system administrator through setup and management of an optimized data storage system. Although applicable to manage data storage associated with a single computing device, the present systems and methods are well-suited for network environments where a host of applications, each with its own data storage schemes and requirements, are deployed and managed.

The present systems and methods for data storage management include an application focused data storage manager. The data storage manager comprises an interface to an accessible data store, an interface to applications with data storage requirements, and a user interface. Illustrated embodiments include network-attached storage as an example data store. It should be understood that the data storage manager is operable on a single computing device coupled to one or more physical data storage devices and is not limited to network-attached storage.

The data storage manager is provided application specific information to support optimal allocation of data storage, which includes both storage directly coupled to a single computing device and network-attached storage, relocation of existing data, and applying data management services such as backup, restore, mirroring, virus detection and isolation, etc. to the stored data. The data storage manager is also configured to assist administrators in managing capacity utilization.

At the highest level of interaction with system administrators and other users, the present systems and methods for data storage management model an application instance. An application instance is a data object that describes the set of application specific storage objects under the control of the network-attached data store that are being used by an application. Application specific storage objects describe allocated and used portions of the data store as well as allocated and unused portions of the data store. As an example, an application instance of an email application operable on a Microsoft Exchange Server® includes the collection of areas of network-attached storage including the Exchange databases and logs. Microsoft Exchange Server® is the registered trademark of the Microsoft Corporation of Redmond, Wash., U.S.A. A file sharing application instance includes an area of network-attached storage comprising file data accessed via file sharing protocols such as a network file system (NFS) and a common Internet file system (CIFS). These file shares are commonly exposed to clients as mount points or shared folders. In general, an application instance associates a collection of areas within the network-attached data store with one or more applications, each of which identifies files, directories, and/or volumes accessible by an application running on a computing device coupled to the data store. The application instance is the operational unit managed by the data storage manager.

Application instances enable the data storage manager to track storage utilization across multiple data storage schemes and at a granularity smaller than a whole data storage system. Exchange data stored under an Exchange storage group, for example, is optimally stored using separate volumes for database and log files. A first application storage object describes an Exchange Mailstore. The first application storage object includes storage attributes such as an application storage unit, a default application storage-unit size, and one or more indicators identifying a level of service associated with a data storage management operation. For an Exchange Mailstore, the application storage unit is a mailbox and the application storage-unit size is a portion of the volume used to host the Mailstore. The Exchange Log is stored on a separate logical/physical storage device than the Exchange Mailstore. A second application storage object describes the Exchange Log. The second application storage object includes storage attributes specific to the Exchange Log. The third application storage object describes an Exchange Public Store. The third application storage object includes storage attributes such as an application storage unit (i.e., a folder), a default application storage-unit size (i.e., a folder size), and one or more indicators identifying an optimized level of service associated with a data storage management operation applied on the data in the Public Store.

A second application instance describes a printer queue. Data stored within the print queue can be stored in one or more logical/physical storage devices. The application storage object is a printer queue. The printer cache includes storage attributes such as an application storage unit, a default application storage-unit size, and one or more indicators identifying a level of service associated with a data storage management operation. The application storage unit is a printer cache. The application storage-unit size is an average printer cache size in bytes.

A third application instance describes a file share. Data stored within the file share can be stored in one or more logical/physical storage devices. The application storage object is a file system. The file system includes storage attributes such as an application storage unit, a default application storage-unit size, and one or more indicators identifying a level of service associated with a data storage management operation. The application storage unit is a folder. The application storage-unit size is an average folder size in bytes.

File system data exposed via shared folders can span multiple volumes using mounted directories, or alternatively, multiple shared folders may be stored in a single file system. There are numerous ways to expose data stored within the network-attached storage. Two common approaches are the NFS and CIFS file sharing protocols mentioned above. Other protocols, such as the small computer system interface over transmission control protocol/Internet protocol (TCP/IP) or iSCSI can also be used to couple network-attached storage to the physical devices. The iSCSI protocol exposes storage objects known as iSCSI logical units or LUNs.

Once applications are using information stored within the network-attached storage and under the control of the data storage manager, administrators can monitor an application's data utilization in relationship to other data hosted on the network-attached storage. The utilization of space allocated to volumes from all available storage can be observed. In addition, the utilization of space assigned to each application instance can be observed.

The data storage manager uses an application instance quota mechanism to associate a size limit to an application. The quota mechanism enables the data storage manager to apply one or more size limits to application instances, regardless of whether the underlying data is co-resident within a file system with another application's data or not. Size limits can be enforced or advisory. An enforced limit prohibits further data from being stored by the application and will generate errors. An advisory limit will generate a warning message, which may or may not be associated with a recommended action for the operator to take to rectify the storage configuration that led to the warning condition.

Each application instance is managed via a matrix of operational capabilities based on the application type and one or more attributes. Application types, as described above, include email, file sharing, print serving, desktop system backups, etc. Attributes include allocation, quality of service, backup policy, remote mirror, and virus scanning operations. Various levels of data allocation, quality of service, backup policies, and remote mirroring can be applied via default values, administrator selected levels, and/or application client selected levels.

Reference will now be made in detail to the description of example embodiments of the systems and methods for data storage management as illustrated in the drawings. Reference is made to FIG. 1, which includes a diagram illustrating an embodiment of an operating environment 100 that includes a data storage manager 200. Operating environment 100 comprises network 105 and a host of computing devices and data storage devices coupled via network 105. Computing devices include file server 120, print server 130, email server 140, and data storage manager 200. File server 120 is coupled to network 105 via connection 125. Print server 130 is coupled to network 105 via connection 135. Email server 140 is coupled to network 105 via connection 145. Data storage manager 200 is coupled to network 105 via connection 205. File server 120 is a computing device and one or more storage devices configured to store files. Print server 130 is a computing device configured to manage one or more printers. Email server 140 is a computing device and one or more storage devices configured to manage messages, in addition to one or more of tasks, calendars, notes, contacts, etc.

Data storage manager 200 comprises storage allocator 210, physical storage interface 215, application interface 220, and user interface 230. Data storage manager 200 is configured with application specific information to support optimal allocation of networked attached storage, relocation of existing data onto the networked attached storage, and applying data management services such as backup, restore, mirroring, virus detection, etc., to the stored data. Data storage manager 200 is also configured to assist administrators in observing and managing storage capacity utilization. Data storage manager 200 allocates and uses logical and physical storage elements of a network-attached data store via an application instance that exposes data storage in application specific storage units.

Data communications between each of the computing devices and network 105 can be accomplished using any of a number of local area network architectures and communication protocols. For example, a bus or star topology can be used to couple closely located computing devices to network 105. Carrier-sense multiple access/collision detection, the backbone of Ethernet, Fast Ethernet, and Gigabit Ethernet can be used to manage simultaneous data communications between network 105 and the computing devices.

Data storage devices comprise backup target 150, remote mirror target 160, tape backup 170, storage area network 180, just a bunch of disks (JBOD) 190, and RAID 110. RAID 110 is coupled to network 105 via connection 115. Backup target 150 is coupled to network 105 via connection 155. Remote mirror target 160 is coupled to network 105 via connection 165. Tape backup 170 is coupled to network 105 via connection 175. Storage area network 180 is coupled to network 105 via connection 185. JBOD 190 is coupled to network 105 via connection 195. RAID 110 comprises two or more disk drives that work in combination for fault tolerance and performance. RAID 110 can be configured to operate in a plurality of different data storage modes. Backup target 150 comprises one or more data storage devices designated for backup data storage. Remote mirror target 160 comprises one or more data storage devices designated for storing a reproduction of application data. The reproduction can be programmed to take over or selectively "swapped" with, a primary data storage device should the primary storage device fail. JBOD 190 comprises two or more disk drives that can be accessed and selected by various applications operable across the computing devices coupled to network 105.

Tape backup 170 is a data storage device that encodes data on a magnetically layer applied to a strip of plastic. Tapes and tape drives come in a variety of sizes and use a variety of data storage formats. Tapes have large storage capacities ranging from a few hundred kilobytes to several gigabytes. Data is applied and accessed sequentially along the tape making data access relatively slow in comparison to disks, which can be directed to controllably access any point throughout the medium. Accordingly, tapes are used for transporting large amounts of data, for storing data long term, and as backups should the easier to access disk drives fail.

Storage area network 180 is a network comprising one or more additional data storage devices available to applications operable on the various computing devices coupled to network 105. In some embodiments, storage area network 180 is provided as a service to data subscribers to store remote data backups.

Each of connection 155, connection 165, connection 175, connection 175, connection 195, and connection 115 may comprise a high-bandwidth communication interface that is converted into a parallel interface for communicating with the respective physical storage devices. Some embodiments include the small computer system interface (SCSI) for coupling the network-attached storage 270 to the physical devices. The small computer system interface over transmission control protocol/Internet protocol (TCP/IP) or iSCSI can also be used to couple network-attached storage to the physical devices. The iSCSI protocol is layered on top of Ethernet for communicating between various computing and physical data storage devices.

Figure 2:
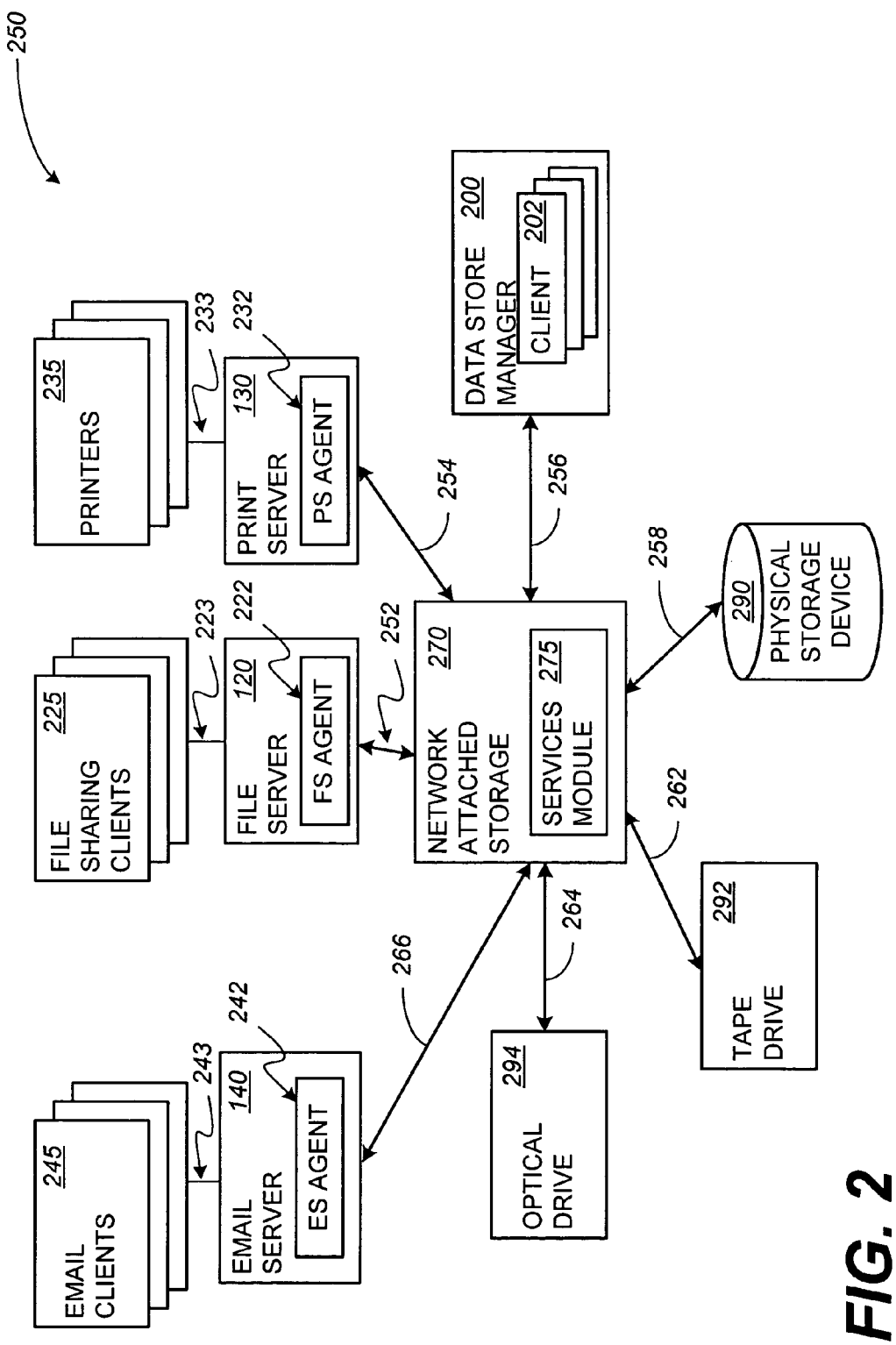
FIG. 2 is a functional block diagram illustrating an embodiment of the data storage management system of FIG. 1.

FIG. 2 is a functional block diagram illustrating an alternative embodiment of the operating environment introduced in FIG. 1. Alternative operating environment 250 represents a deployment model for the data storage management system. As shown in FIG. 2, network-attached storage 270 and data storage manager 200 manage and control data flows between various applications and/or devices and one or more data stores. Network-attached storage 270 is coupled to data storage manager 200 via connection 256. Connection 256 can be a wired or wireless connection. In preferred embodiments, connection 256 is a high-bandwidth link capable of enabling simultaneous communications between various components of the data storage manager 200 and the various agents and modules integrated within computing devices and the network-attached storage 270. The illustrated embodiment depicts files server 120 and print server 130 as separate computing entities from network-attached storage 270. It should be understood that file server 120, print server 130, and other application servers can be integrated (i.e., co-located) with the network-attached storage 270. It follows that application server to application server data transfers can be communicated on an internal data bus under the management of a single computing device. It also follows that application server to network-attached storage transfers can be similarly communicated.

Network-attached storage 270 is coupled to email server 140 via connection 266. Email server 140 is further coupled to email clients 245 via connection 243. Network-attached storage 270 is coupled to file server 120 via connection 252. File server 120 is further coupled to file sharing clients 225 via connection 223. Network-attached storage 270 is coupled to print server 130 via connection 254. Print server 130 is further coupled to printers 235 via connection 233. ES agent 242 is associated with email server 140. FS agent 222 is associated with file server 120. PS agent 232 is associated with print server 130.

Note that network-attached storage 270 in alternative embodiments may be coupled to one or more servers of one or more types. Network-attached storage 270 also manages data allocation, as well as write and read operations among the various physical storage devices. As further illustrated in FIG. 2, network-attached storage 270 is coupled to physical storage device 290 via connection 258. Network-attached storage 270 is coupled to tape drive 292 via connection 262. Network-attached storage 270 is coupled to optical drive 294 via connection 264. Each of connection 258, connection 262, and connection 264 may comprise a parallel interface for coupling the network-attached storage 270 to the respective physical storage device. Some embodiments, as described above, may include the SCSI protocol and/or iSCSI protocols for coupling the network-attached storage 270 to the physical devices.

A data storage management framework comprises one or more agents associated with respective computing devices, a services module associated with the network-attached storage 270, and a data storage manager client 202. Each of the one or more agents (i.e., ES agent 242, FS agent 222, and PS agent 232), the services module 275, and data storage manager client 202 reside in their own respective processes.

Services module 275 runs on the network-attached storage 270. In addition to enabling communications with the data storage manager 200 via client 202, services module 275 retains objects that hold application specific knowledge. Services module 275 enables a host of data storage operations that are available to the various applications via data that is hosted in the network-attached storage 270. Data storage operations include data allocation, data migration, and data observation. Other data storage operations include and managing storage growth, backing up and mirroring data, scanning for viruses, and guaranteeing various quality of service levels.

Each of the one or more agents (i.e., ES agent 242, FS agent 222, and PS agent 232) interfaces with the operating system on the respective computing device to connect and use the storage provided by the network-attached storage 270. In an example embodiment this includes communicating with physical device initiators to mount and configure logical storage units, interacting with a file system to create and format a volume over the logical storage units, using the volume to consume the available storage and make it available to applications. Each of the one or more agents (i.e., ES agent 242, FS agent 222, and PS agent 232) further interfaces with one or more applications running on the respective computing device. The agents mine information regarding allocation size and usage related to the one or more applications operative on their respective computing device, invoke application specific interfaces to migrate existing data to the network-attached storage 270, and inform applications when and where newly allocated storage is located.

Those skilled in the art will appreciate that each of the ES agent 242, FS agent 222, PS agent 232, services module 275, and client 202 can be implemented in hardware, software, firmware, or combinations thereof. In one embodiment, each of the ES agent 242, FS agent 222, PS agent 232, services module 275, and client 202 are implemented using a combination of hardware and software or firmware that is stored in a memory and executed by a suitable instruction execution system. It should be noted, however, that the ES agent 242, FS agent 222, PS agent 232, services module 275, and client 202 are not dependent upon the nature of the underlying processor and/or memory infrastructure to accomplish designated functions.

If implemented solely in hardware, as in an alternative embodiment, the ES agent 242, FS agent 222, PS agent 232, services module 275, and client 202 can be implemented with any or a combination of technologies which are well-known in the art (e.g., discrete logic circuits, application specific integrated circuits (ASICs), programmable gate arrays (PGAs), field programmable gate arrays (FPGAs), etc.), or technologies later developed.

Figure 3:
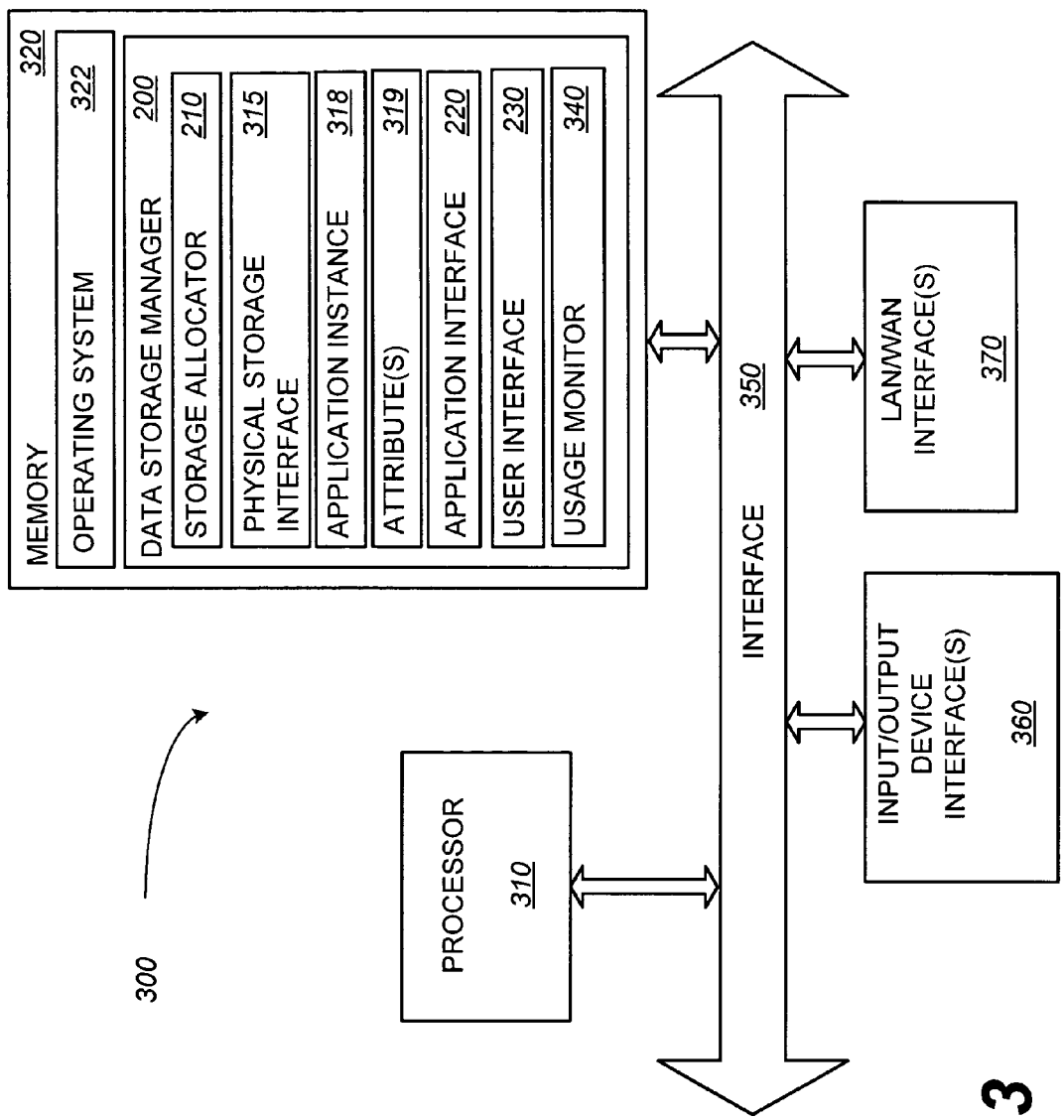
FIG. 3 is a functional block diagram illustrating an embodiment of a computing device configured with the data manager of FIG. 2.

FIG. 3 is a functional block diagram illustrating an embodiment of a computing device configured with the data storage manager of FIGS. 1 and 2. The embodiment illustrated in FIG. 3 shows each of the various functional modules of the data storage manager 200 within memory 320. Those of ordinary skill in the art will understand that each of the various functional modules may be implemented in a separate computing device having a memory separate from memory 320. Memory 320 can be an integrated circuit device, an internal hard-disk drive, a magnetic tape drive, a compact-disk drive, and/or other data storage devices now known or later developed that can be made operable with processor 310. In some embodiments, software instructions and/or data associated with the data storage manager 200 may be distributed across several of the above-mentioned data storage devices.

Generally, in terms of hardware architecture, as shown in FIG. 3, the computing device 300 may include a processor 310, memory 320, input/output device interface(s) 360, and LAN/WAN interface(s) 370 that are communicatively coupled via interface 350. Interface 350 can be, for example but not limited to, one or more buses or other wired or wireless connections, as is known in the art or that may be later developed. Interface 350 may have additional elements, which are omitted for simplicity, such as controllers, buffers (caches), drivers, repeaters, and receivers, to enable communications. Further, interface 350 may include address, control, and/or data connections to enable appropriate communications among the aforementioned components.

In the embodiment of FIG. 3, the processor 310 is a hardware device for executing software that can be stored in memory 320. The processor 310 can be any custom-made or commercially-available processor, a central processing unit (CPU) or an auxiliary processor among several processors associated with the computing device 300 and a semiconductor-based microprocessor (in the form of a microchip) or other executable instruction processors.

Memory 320 can include any one or combination of volatile memory elements (e.g., random access memory (RAM, such as dynamic RAM or DRAM, static RAM or SRAM, etc.)) and nonvolatile memory elements (e.g., read-only memory (ROM), hard drives, tape drives, compact discs (CD-ROM), etc.). Moreover, the memory 320 may incorporate electronic, magnetic, optical, and/or other types of storage media now known or later developed. Note that the memory 320 can have a distributed architecture, where various components are situated remote from one another, but accessible by processor 310.

The software in memory 320 may include one or more separate programs, each of which comprises an ordered listing of executable instructions for implementing logical functions. In the example of FIG. 3, the software and data elements in memory 320 includes storage allocator 210, physical storage interface 315, application instance 318, attribute(s) 319, application interface 220, user interface 230, and usage monitor 340 that function and/or store information as a result of and in accordance with operating system 322. The operating system 322 preferably controls the execution of programs, such as the various functional components of the data storage manager 200 and provides scheduling, input-output control, file and data management, memory management, and communication control and related services.

In a preferred embodiment, the various functional modules of data storage manager 200 (i.e., storage allocator 210, physical storage interface 315, application interface 220, user interface 230, and usage monitor 340) comprise one or more source programs, executable programs (object code), scripts, or other collections each comprising a set of instructions to be performed. It will be well-understood by one skilled in the art, after having become familiar with the teachings of the data storage manager 200, that the data storage manager 200 and each of its functional modules may be written in a number of programming languages now known or later developed.

The input/output device interface(s) 360 may take the form of human/machine device interfaces for communicating via various devices, such as but not limited to, a keyboard, a mouse or other suitable pointing device, a microphone, etc. LAN/WAN interface(s) 370 may include a host of devices that may establish one or more communication sessions between the computing device 300 and network 105 (FIG. 1). LAN/WAN interface(s) 370 may include but are not limited to, a modulator/demodulator or modem (for accessing another device, system, or network); a radio frequency (RF) or other transceiver; a telephonic interface; a bridge; an optical interface; a router; etc. For simplicity of illustration and explanation, these aforementioned two-way communication devices are not shown.

When the computing device 300 is in operation, the processor 310 is configured to execute software stored within the memory 320, to communicate data to and from the memory 320, and to generally control operations of the computing device 300 pursuant to the software. Each of the functional modules and the operating system 322, in whole or in part, but typically the latter, are read by the processor 310, perhaps buffered within the processor 310, and then executed.

Each of the functional modules illustrated within memory 320 can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this disclosure, a "computer-readable medium" can be any means that can store, communicate, propagate, or transport a program for use by or in connection with the instruction execution system, apparatus, or device. The computer-readable medium can be, for example but not limited to, an electronic, magnetic, optical, electromagnetic, infrared, or semiconductor system, apparatus, device, or propagation medium now known or later developed. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 4:
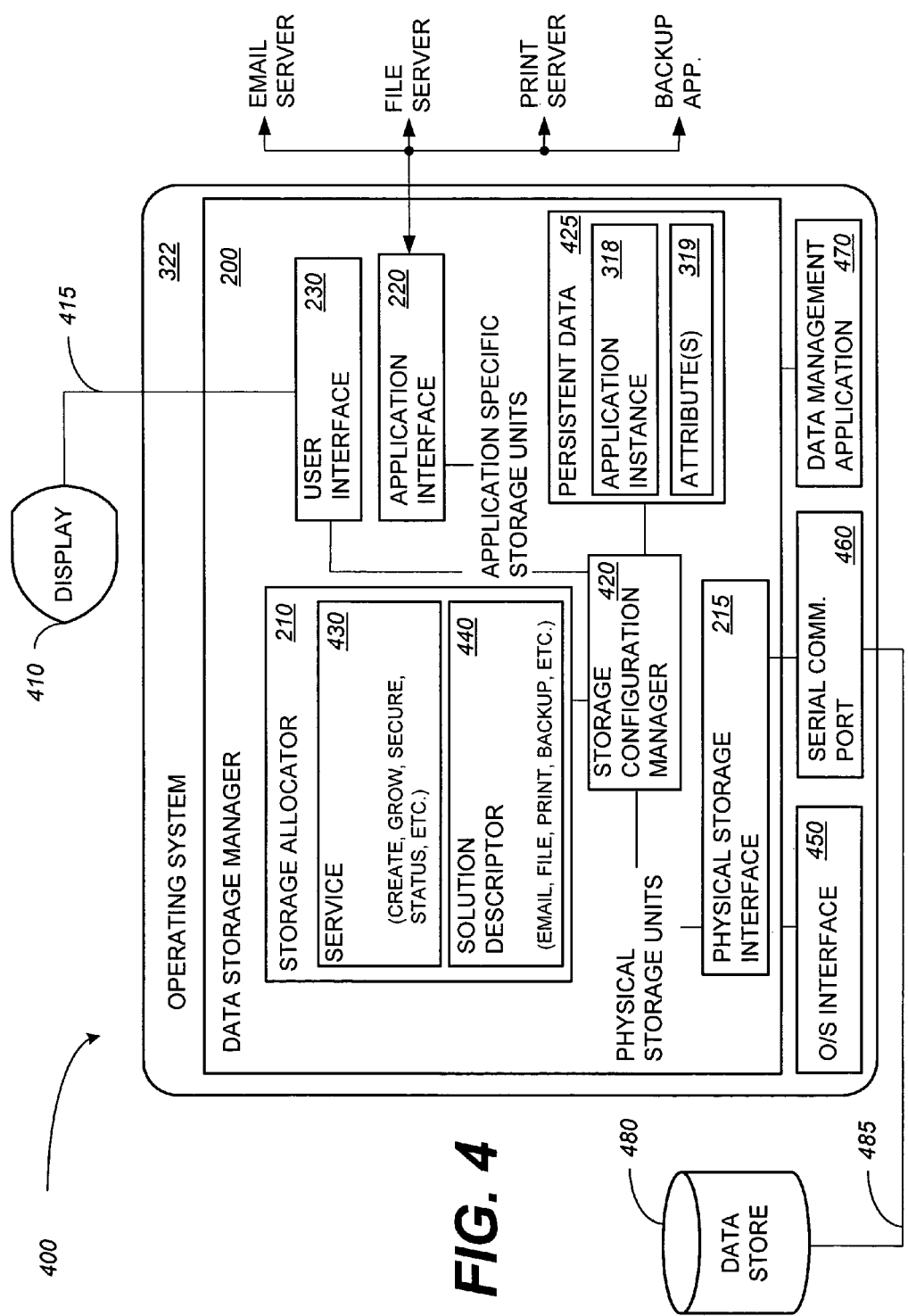
FIG. 4 is a functional block diagram illustrating an embodiment of the architecture of the data manager of FIG. 2.

FIG. 4 is a functional block diagram illustrating an embodiment of a data storage management system that uses operating system 322 and data storage manager 200 to allocate and expose storage space on data store 480. Operating system 322 couples the data storage manager 200 to data store 480, one or more applications, and display 410. Connection 415 forwards a plurality of video signals from user interface 230 to display 410. Connection 485 forwards a plurality of data signals from serial communication port 460 to data store 480. Application interface 220 couples one or more applications operative on one or more computing devices to data storage manager 200. Inputs to the data storage management system 400 are received from one or more applications operative on one or more servers (e.g., email, file, and print servers) or other computing devices and data store 480 communicatively coupled to data storage manager 200 via operating system 322. Outputs from the data storage manager 200 include data saved within data store 480, information forwarded from application interface 220 to the one or more applications, as well as signals forwarded via user interface 230 to display 410.

Operating system 322 controls the execution of programs, such as the various functional components of the data storage manager 200 and provides scheduling, input-output control, file and data management, memory management, and communication control and related services. Data management application 470 is configured to provide long term file and data management and random access memory management. Operating system 322 communicates with data storage manager 200 via operating system interface 450.

Data storage manager 200 comprises storage allocator 210, storage configuration manager 420, physical storage interface 215, and persistent data 425 in addition to the previously described application interface 220 and user interface 230. Data storage allocator 210 comprises service 430 which is configured to create, grow, secure, and provide status information regarding storage locations within data store 480. Data storage allocator 210 further comprises solution descriptor 440 which contains information defining storage schemes for specific data storage applications such as email, file sharing, print serving, backup and restore operations, etc. Data storage manager 200 includes a data storage management algorithm that applies an optimized data storage solution responsive to one or more applications. The data storage management algorithm encompasses data storage configurations that balance data security, data transfer rate optimization, and other data storage management goals across the various applications.

Storage configuration manager 420 coordinates the various functions of the interfaces, storage allocator 210, and controls updates to persistent data 425. As indicated in the diagram, storage configuration manager 420 communicates with physical storage interface 215 in terms of physical storage units and communicates with user interface 230 and application interface 220 in terms of application specific storage units and raw storage units. As an example, a client mailbox is an application specific storage unit for an email application. A shared folder is an example of an application specific storage unit for a file sharing application.

Persistent data 425 includes one or more application instance(s) 318 that describe the set of data storage areas that are allocated and used by a particular application operable on a computing device coupled to data storage manager 200 and data store 480. Persistent data 425 further includes one or more attributes 319 which define various services and operational functions that data storage manager 200 will coordinate and perform to data stored within data store 480. Default attributes 319 may be defined in accordance with the type of application that is storing data to data store 480. Attributes 319 may also be selectively configurable with one or more attributes accessible and configurable by a system administrator. Other attributes can be configured to be selectively configurable to a user of the application. Attributes 319 control data management operations such as backup frequency, backup type, data restore, and data mirror operations. Additional attributes 319 define a quality of service and a backup policy that defines what data is to be included in a backup operation.

Figure 5:
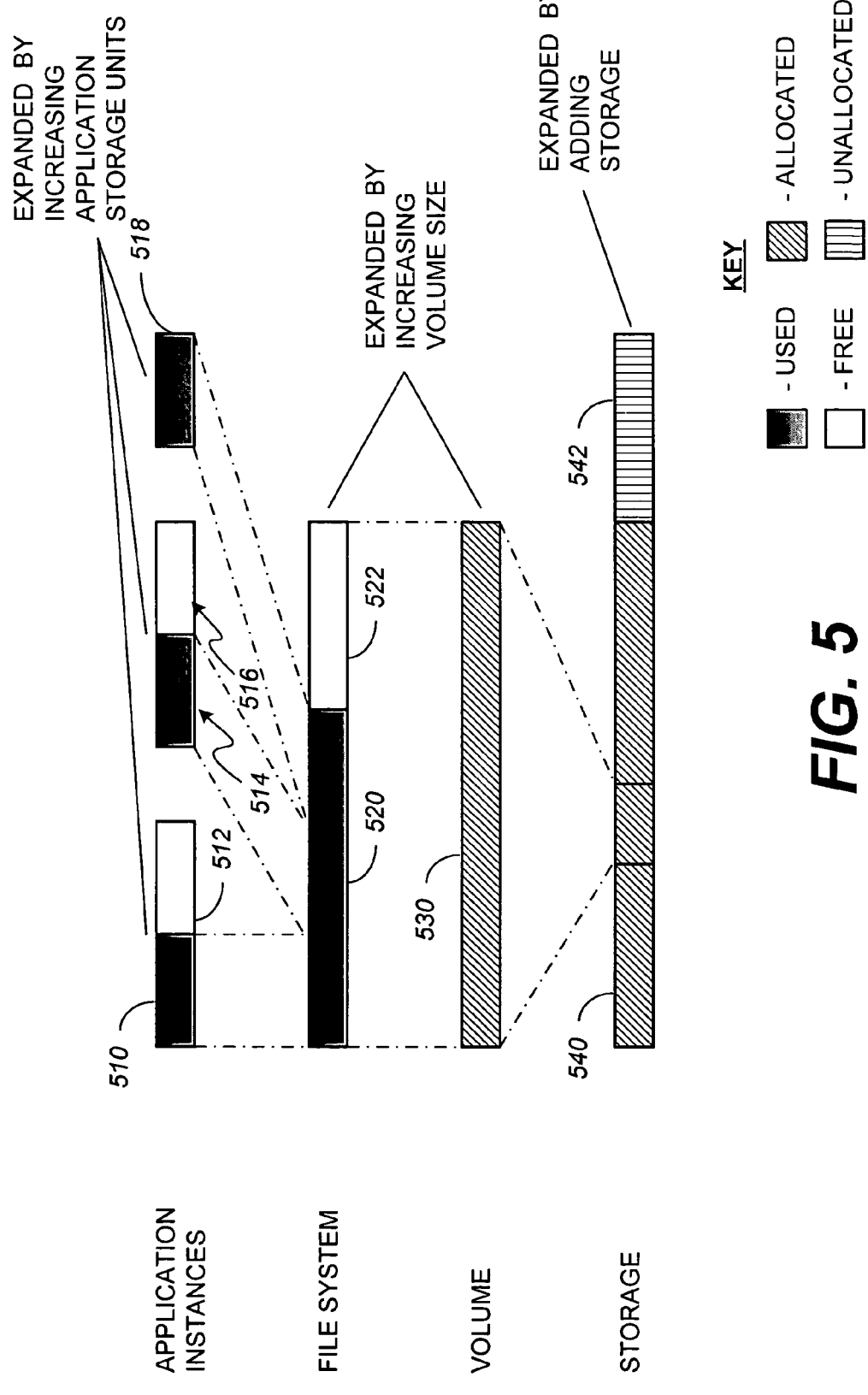
FIG. 5 is a diagram illustrating an embodiment of an application storage model used by the data manager of FIG. 2.

FIG. 5 is a diagram illustrating an embodiment of an application storage model used by the data manager of FIG. 2. Application storage model 500 contains four levels of abstraction ranging from physical storage at the base of the model to application instances at the top portion of the model. As shown in FIG. 5, application instances include a set of allocated portions of a data store (e.g., network-attached storage 270) associated with an application. A first portion comprises used area 510 and unused area 512. A second portion comprises a used area 514 and unused area 516. A third portion comprises a used area 518. Used area 510, used area 514, and used area 518 include allocated storage locations that presently contain information associated with the application. Unused area 512 and unused area 516 include allocated storage locations that presently are available to the application but do not contain information associated with the application. As indicated in the key to the application storage model 500, unused area 512 and unused area 516 are also commonly described as free storage space. As further illustrated in the diagram, increasing application instances expands data storage capacity.

A file system defines a next lower abstraction of data storage in application storage model 500. The file system comprises a first portion and a second portion. The first portion comprises a used area 520. A second portion comprises an unused area 522. Used area 520 includes allocated storage locations that presently contain information associated with the application instances. The area allocated for each application instance in the used area 520 is enforced by standard quota management software available within the file system. Unused area 522 includes allocated storage locations that presently are available to the application instances but do not contain information associated with the application instances. As indicated in the key to the application storage model 500, unused area 522 is also commonly described as free storage space. As indicated by the dotted lines, used area 520 is the sum of used area 510, used area 514, and used area 518. Unused area 522 is the sum of unused area 512 and unused area 516 plus any unused and unallocated data storage space in the file system.

A volume defines the next lower abstraction of data storage in application storage model 500. Volume 530 comprises the sum of used area 520 and unused area 522 of the file system. As further illustrated in the diagram, increasing volume size expands data storage capacity.

Physical storage is the lowest level of data storage in application storage model 500. Physical storage comprises used data locations 540 and unused data locations 542. Adding more storage expands physical data storage capacity.

Network accessible data storage configurations that use the iSCSI protocol as a data transport mechanism introduce various additional data abstraction layers between the file system and the volume illustrated in the application storage model 500 of FIG. 5. Some of these layers of data abstraction include a remote volume, an iSCSI logical disk, an iSCSI pool, and an additional optional file system.

iSCSI is an IP-based storage networking standard for linking data storage facilities, developed by the Internet Engineering Task Force (IETF). By carrying SCSI commands over IP networks, iSCSI is used to facilitate data transfers over intranets and to manage storage over long distances. Because of the ubiquity of IP networks, iSCSI can be used to transmit data over local area networks (LANs), wide area networks (WANs), or the Internet and can enable location-independent data storage and retrieval.

When an end user or application sends a request, the operating system generates the appropriate SCSI commands and data request, which then go through encapsulation and, if necessary, encryption procedures. A packet header is added before the resulting IP packets are transmitted over an Ethernet connection. When a packet is received, it is decrypted (if it was encrypted before transmission), and disassembled, separating the SCSI commands and request. The SCSI commands are sent on to the SCSI controller, and from there to the SCSI storage device. Because iSCSI is bi-directional, the protocol can also be used to return data in response to the original request.

iSCSI is one of two main approaches to storage data transmission over IP networks; the other method, Fibre Channel over IP (FCIP), translates Fibre Channel control codes and data into IP packets for transmission between geographically distant Fibre Channel storage area networks. FCIP (also known as Fibre Channel tunneling or storage tunneling) can only be used in conjunction with Fibre Channel technology; in comparison, iSCSI can run over existing Ethernet networks. A number of vendors, have introduced iSCSI-based products (such as switches and routers).

Data store manager 200 (FIG. 1) manages application data through its entire life cycle. Application instances are created within data store 480, application data is migrated into the data store 480, and the application data within data store 480 is monitored and manipulated in accordance with user/application requirements over time.

For example, an Exchange instance comprising an Exchange storage group is created automatically in accordance with an application storage object and storage attributes. The data storage manager 200 automatically determines a recommended storage configuration and allows a user to optionally override the recommended configuration before using the storage. Items considered in determining an optimized data storage configuration include the physical and logical layouts. Physical level considerations include whether to use an array of disks, the type of drives to be used (e.g., SCSI, Fibre Channel, etc.), LUN attributes (e.g., spindle count, RAID level, stripe size, spindle layout, etc.), and controller parameters. Logical level considerations whether to use one or more volumes, partitions, formatted vs. raw data areas, software RAID settings, etc. Particular layouts will be application specific and will be adaptable as the data store manager 200 controls additional applications.

Once the recommended storage group layout is identified, the data store manager 200 confirms that the proposed storage group layout is applicable to the physical hardware accessible to the data store manager 200. The operations to fully configure the storage may be quite involved. Accordingly, the data store manager 200 confirms with a high degree of confidence that the necessary operations to configure the physical storage can be successfully completed before actually performing the operations on the data store 480. When the confirmation process indicates that the recommended physical storage layout cannot be achieved, a next best storage configuration is proposed in an iterative process until a physical layout is confirmed.

Once a physical storage layout is confirmed, the operations necessary to implement the configuration are performed on the physical and logical storage layers of the data store 480. The data storage manager 200 then invokes the application specific API(s) to introduce the new storage group. This includes passing the location and details about the newly created storage.

Next, the newly created storage can be populated with previously stored application specific data. Generally, an application will be discovered or otherwise identified as a candidate for migration to the data store 480. Once selected, application specific information such as data components are communicated to the data storage manager 200. Thereafter, the application is suspended while each of the components is transferred to the data store 480. Data store manager 200 signals the application to resume once the data migration has completed. At this point the application instance(s) are operational and data store manager 200 monitors and manipulates data store 480 in accordance with user/application requirements over time. Data manipulations include growing, shrinking, and shifting physical storage space, modifying levels of service, etc.

Figure 6:
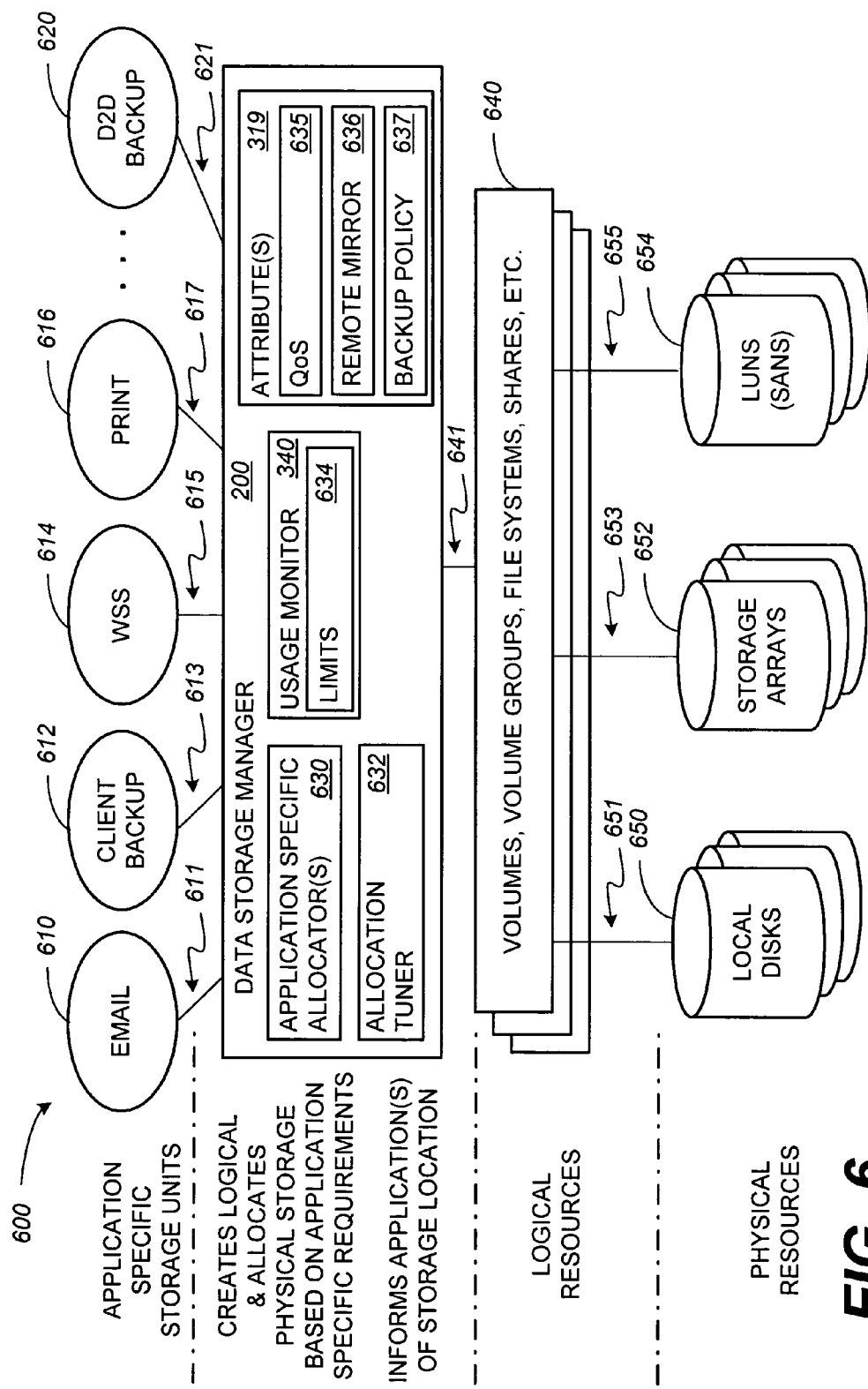
FIG. 6 is a functional block diagram illustrating an embodiment of a storage-configuration architecture used by the data storage management system of FIG. 1.

FIG. 6 is a functional block diagram illustrating an embodiment of a storage configuration architecture used by the data storage management system of FIG. 1. As illustrated in FIG. 6, email application 610 is coupled to data storage manager 200 via connection 611. Client backup application 612 is coupled to data storage manager 200 via connection 613. Web storage system application 614 is coupled to data storage manager 200 via connection 615. Print server application 616 is coupled to data storage manager 200 via connection 617.

Additional applications are also contemplated including the storage of online tables or databases including data associated with object-oriented databases.

Logical resources represented by volumes, volume groups, file systems, and shares 640 are coupled to data storage manager 200 via connection 641. The volumes, volume groups, file systems, and shares 640 are coupled to local disks 650 via connection 651. Volumes, volume groups, file systems, and shares 640 are coupled to storage arrays 652 via connection 653. Logical units and/or storage area networks 654 are coupled to the volumes, volume groups, file systems, and shares 640 via connection 655.

Data storage manager 200 comprises application specific allocators 630, allocation tuner 632, usage monitor 340, and attribute(s) 319. Application specific allocators 630 include information concerning respective optimized application data storage schemes and requirements. For example, email applications prefer to store database files and logs on separate volumes.

A more complete example of a data storage management algorithm for email applications applies the following guidelines for optimizing performance. Log and database files are stored on separate physical storage devices. The separation of log and database files enables a simplified recovery if either log or database storage is corrupted. In addition, the separation of log and database files provides for optimal performance given different workload behaviors. Logs are stored on dedicated physical storage devices separate from other application storage areas. Logs are stored using RAID 1 to optimize data transfer rates. Databases are stored using RAID 5 to balance data transfer rates and capacity utilization. Data storage allocation is set at least twice as large as the size of the database to permit localized restores from backups and to prevent fragmentation from adversely affecting system performance.

A typical email client mailbox may be allocated a fixed amount of physical data storage until that particular client's mailbox storage needs grow. Allocation tuner 632 is provided information concerning one or more applications and contains allocation rules for how to distribute one or more available physical storage resources across various active applications using the managed data. Allocation tuner 632 may be configured to work in conjunction with user interface 230 to decrease the allocated data assigned to one or more applications when the allocated data has been increased for another application. Allocation tuner 632 maintains an optimized overall data allocation and usage across the managed applications.

Usage monitor 340 interfaces with the various physical resources to present one or more a representations that reflect current data utilization across the managed applications. Usage monitor 340 is configured to provide data storage usage information for each application that stores data. The information can be presented in terms of application specific storage units and in raw physical storage units. The information can also be presented in terms of logical units such as volumes, volume groups, file shares, etc. As further illustrated in FIG. 6. Usage monitor 340 is configured with one or more limits 634. The one or more limits can be associated with individual managed applications by application type, application user, or other factors. Limits 634 can reflect multiple levels of actual storage usage and may include an advisory limit and an enforceable limit. Usage monitor 340 issues a warning message that the particular application is approaching complete usage of the physical storage space allocated to the application when an advisory limit is reached or exceeded. In some embodiments, data storage manager 200 can be configured to automatically allocate additional storage space in response to an application instance reaching and/or exceeding an advisory limit. In other embodiments, a responsible administrator with appropriate authority and access is notified when an application instance reaches and/or exceeds a corresponding advisory limit. An enforceable limit prohibits data from being stored to the data store and issues one or more error notices to a system administrator and/or a user of the associated application.

Attribute(s) 319 include a quality of service identifier 635, a remote mirror identifier 636, and a backup policy identifier 637. Quality of service identifier 635 instructs the data storage manager 200 to apply one or more levels of security and/or fault tolerance. Remote mirror identifier 636 instructs the data storage manager 200 to apply data mirroring to a particular application instance. Backup policy identifier 637 instructs data storage manager 200 regarding data to backup, the frequency at which to backup data, and the type of backup to perform.

Storage configuration architecture 600 illustrates multiple levels of data abstraction. At the application level, application specific storage units are used to describe data that is stored. The data storage manager 200 creates logical and allocates physical storage based on application-specific data storage requirements. In addition, data storage manager 200 informs applications of the storage location. Logical resources such as volumes, volume groups, file systems, file shares, etc. bridge the gap between data storage manager 200 and multiple physical storage resources.

Figure 7:
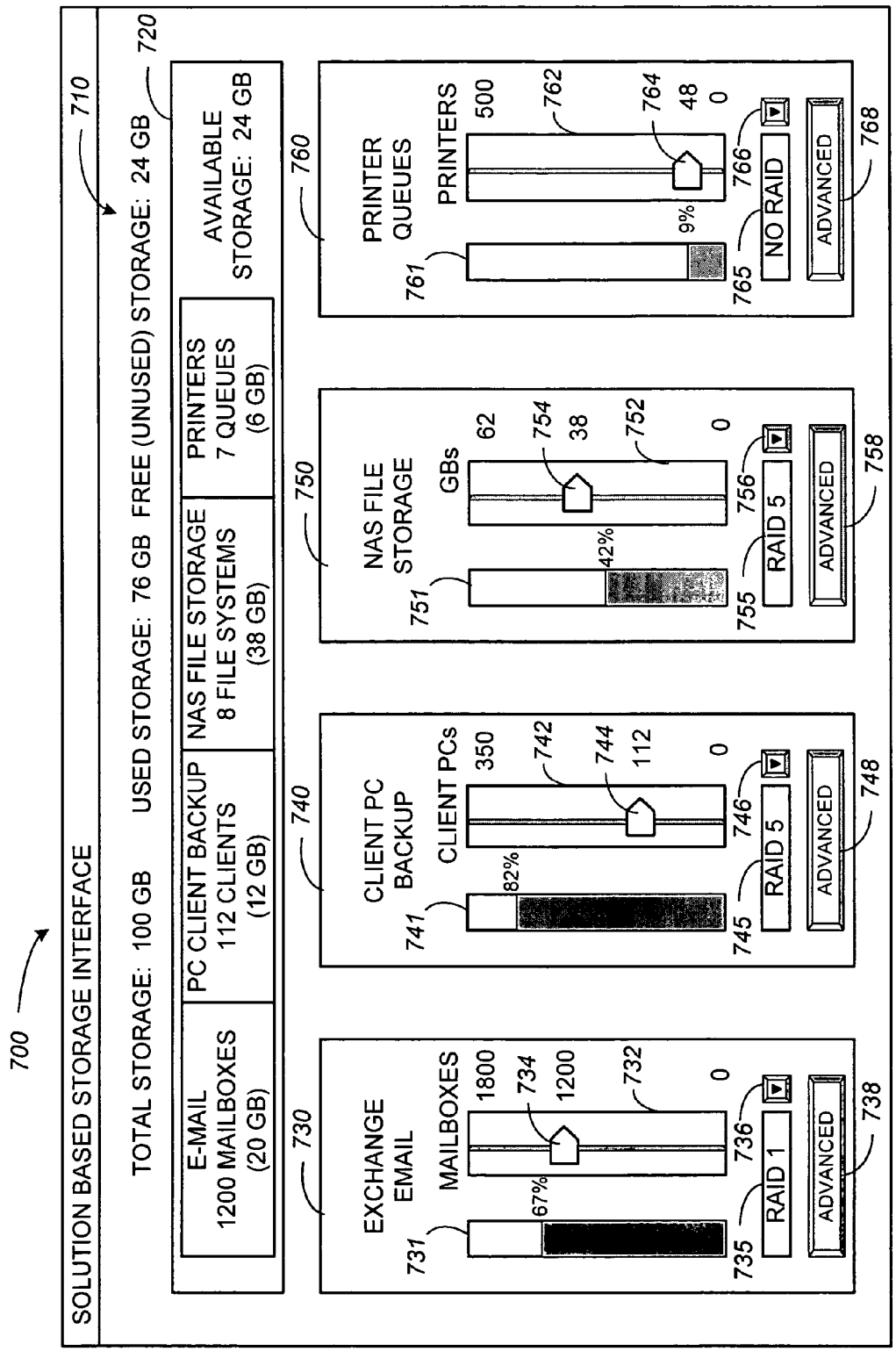
FIG. 7 is a diagram illustrating an embodiment of a graphical user interface generated by the data manager of FIG. 2.

FIG. 7 is a diagram illustrating an embodiment of a graphical user interface generated by the data manager of FIG. 2. Solution based storage interface 700 includes an allocation summary area 710 that lists total storage, used storage and free (unallocated) storage under the control and management of the data store manager 200. Solution based storage interface 700 also includes an application summary area 720 that reveals total usage of each application that has stored managed data with data store manager 200. The total usage is displayed in both application specific storage units as well as raw storage in bytes. In the illustrated embodiment, applications include email, personal computer (PC) backup, shared file storage, and printer queues.

Solution based storage interface 700 also includes application specific panels that provide a mechanism for monitoring and comparing storage growth across the various applications, a mechanism for adjusting allocated storage space across the applications, as well as a mechanism for controllably overriding a default level of data security. For example, Exchange email panel 730 includes usage scale 731, which reveals actual data storage usage as a percentage of the allocated space for an Exchange email application. Mailbox adjustment scale 732 includes slider 734, which can be manipulated by an operator of the solution based storage interface 700. Adjustment of the slider 734 to increase the number of available mailboxes results in a corresponding decrease of one or more of the storage amounts allocated to the remaining applications. Adjustment of the slider 734 to decrease the number of available mailboxes results in a corresponding increase of one or more of the storage amounts allocated to the remaining applications. Menu button 736 opens a drop-down menu, which can be used to selectively override a default data security level by selecting an appropriate RAID level. Data protection display 735 presents the presently selected and operable RAID level being applied to the Exchange email data. Advanced pushbutton 738, when selected, opens a secondary interface that provides a mechanism for modifying the amount of raw storage that is allocated for each user mailbox.

Client PC backup panel 740 includes usage scale 741, which reveals actual data storage usage as a percentage of the allocated space for a client PC backup application. PC adjustment scale 742 includes slider 744, which can be manipulated by an operator of the solution based storage interface 700. Adjustment of the slider 744 to increase the number of PCs to backup results in a corresponding decrease of one or more of the storage amounts allocated to the remaining applications. Adjustment of the slider 744 to decrease the number of PCs to backup results in a corresponding increase of one or more of the storage amounts allocated to the remaining applications. Menu button 746 opens a drop-down menu, which can be used to selectively override a default data security level by selecting an appropriate RAID level. Data protection display 745 presents the presently selected and operable RAID level being applied to the backed up data. Advanced pushbutton 748, when selected opens a secondary interface that provides a mechanism for modifying the amount of raw storage that is allocated for each PC designated for periodic backup tasks.

File share panel 750 (i.e., NAS file storage) includes usage scale 751, which reveals actual data storage usage as a percentage of the allocated space for a file share stored and managed by the data storage manager 200. File share adjustment scale 752 includes slider 754, which can be manipulated by an operator of the solution based storage interface 700. Adjustment of the slider 754 to increase the number of PCs to backup results in a corresponding decrease of one or more of the storage amounts allocated to the remaining applications. Adjustment of the slider 754 to decrease the number of PCs to backup results in a corresponding increase of one or more of the storage amounts allocated to the remaining applications. Menu button 756 opens a drop-down menu, which can be used to selectively override a default data security level by selecting an appropriate RAID level. Data protection display 755 presents the selected and operable RAID level being applied to the file share data. Advanced pushbutton 758, when selected opens a secondary interface that provides a mechanism for modifying various file share properties.

Printer queue panel 760 includes usage scale 761, which reveals actual data storage usage as a percentage of the allocated space for a plurality of printer device queues managed by the data storage manager 200. Printer adjustment scale 762 includes slider 764, which can be manipulated by an operator of the solution based storage interface 700. Adjustment of the slider 764 to increase the number of printer queues results in a corresponding decrease of one or more of the storage amounts allocated to the remaining applications. Adjustment of the slider 764 to decrease the number of printer queues results in a corresponding increase of one or more of the storage amounts allocated to the remaining applications. Menu button 766 opens a drop-down menu, which can be used to selectively override a default data security level by selecting an appropriate RAID level. Data protection display 765 presents the selected and operable RAID level being applied to the data in the printer queues. Advanced pushbutton 768, when selected, opens a secondary interface that provides a mechanism for modifying the amount of raw storage that is allocated for each printer queue.

Figure 8:
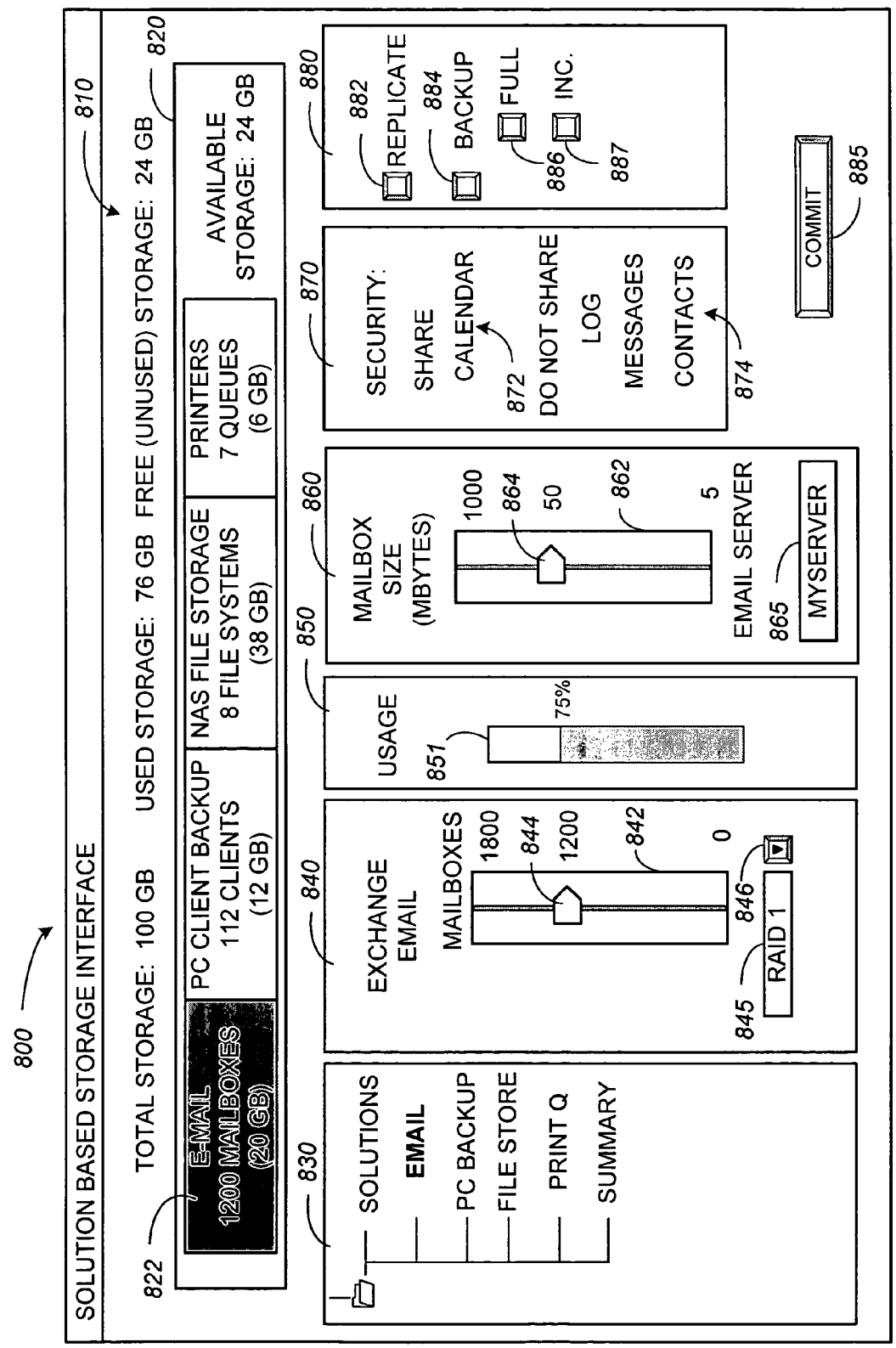
FIG. 8 is a diagram illustrating an alternative embodiment of a graphical user interface generated by the data manager of FIG. 2.

FIG. 8 is a diagram illustrating an alternative embodiment of a graphical user interface generated by the data manager of FIG. 2. Solution based storage interface 800 includes an allocation summary area 810 that lists total storage, used storage and free (unused) storage under the control and management of the data store manager 200. Solution based storage interface 800 also includes an application summary area 820 that reveals total usage of each application that has stored managed data with data store manager 200. The total usage is displayed in both application specific storage units as well as raw storage in bytes. In the illustrated embodiment, applications include email, personal computer (PC) backup, shared file storage, and printer queues.

Solution based storage interface 800 also includes application specific panels associated with a select application. In the example embodiment, application pushbutton 822, associated with a Microsoft Exchange® email application is selected as indicated by a different background color on pushbutton 822. When pushbutton 822 is selected, panels are displayed within interface 800 that provide mechanisms for monitoring and otherwise managing email data. For example, panel 830 provides a graphic view of an organizational tree including an indication of the presently selected storage application. When pushbutton 885, labeled "COMMIT," is selected the present status of operator adjustable items within the various application specific panels are updated and made operable by the data storage manager 200.

Exchange email panel 840 includes adjustment scale 842 with slider 844, which can be manipulated by an operator of the solution based storage interface 800. Adjustment of the slider 844 to increase the number of available mailboxes results in a corresponding decrease of one or more of the storage amounts allocated to the remaining applications. Adjustment of the slider 844 to decrease the number of available mailboxes results in a corresponding increase of one or more of the storage amounts allocated to the remaining applications. Menu button 846 opens a drop-down menu, which can be used to selectively override a default data protection level by selecting an appropriate RAID level. Data protection display 845 presents the presently selected and operable RAID level being applied to the Exchange email data.

Usage panel 850 includes usage scale 851, which reveals actual data storage usage as a percentage of the allocated space for an Exchange email application.

Mailbox panel 860 includes adjustment scale 862 with slider 864, which can be manipulated by an operator of the solution based storage interface 800. Adjustment of the slider 864 to increase mailbox storage allocated to each email user results in a corresponding decrease of the available storage. Adjustment of the slider 864 to decrease mailbox storage allocated to each user results in a corresponding increase of the available storage with an amount of available storage displayed within application summary area 820. Mailbox panel 850 further includes server display 865, which displays the logical name of the email server.

Security panel 870 includes a share area 872 and a do not share area 874. Data components listed in the share area 872 are configured to allow access by all users with access privileges to the email server displayed in display 865. Data components listed in the do not share area 874 are configured to prohibit access by all users other than the owner of the data components with access privileges on the email server displayed in display 865.

Backup panel 880 includes check button 882, labeled "REPLICATE," the selection of which generates a data mirror of the stored data. Backup panel 880 further includes check button 884, labeled "BACKUP," the selection of which instructs the data storage manager 220 to perform a periodic backup task on the stored data. Check button 886, labeled "FULL," when selected instructs the data storage manager 200 that messages, contacts, logs, tasks, calendar items, etc., are to be stored with each backup task. Check button 887, labeled "INC.," instructs the data storage manager 200 to perform an incremental backup of the stored data. An incremental backup saves only those files that have been created or modified since the last backup task.

Figure 9:
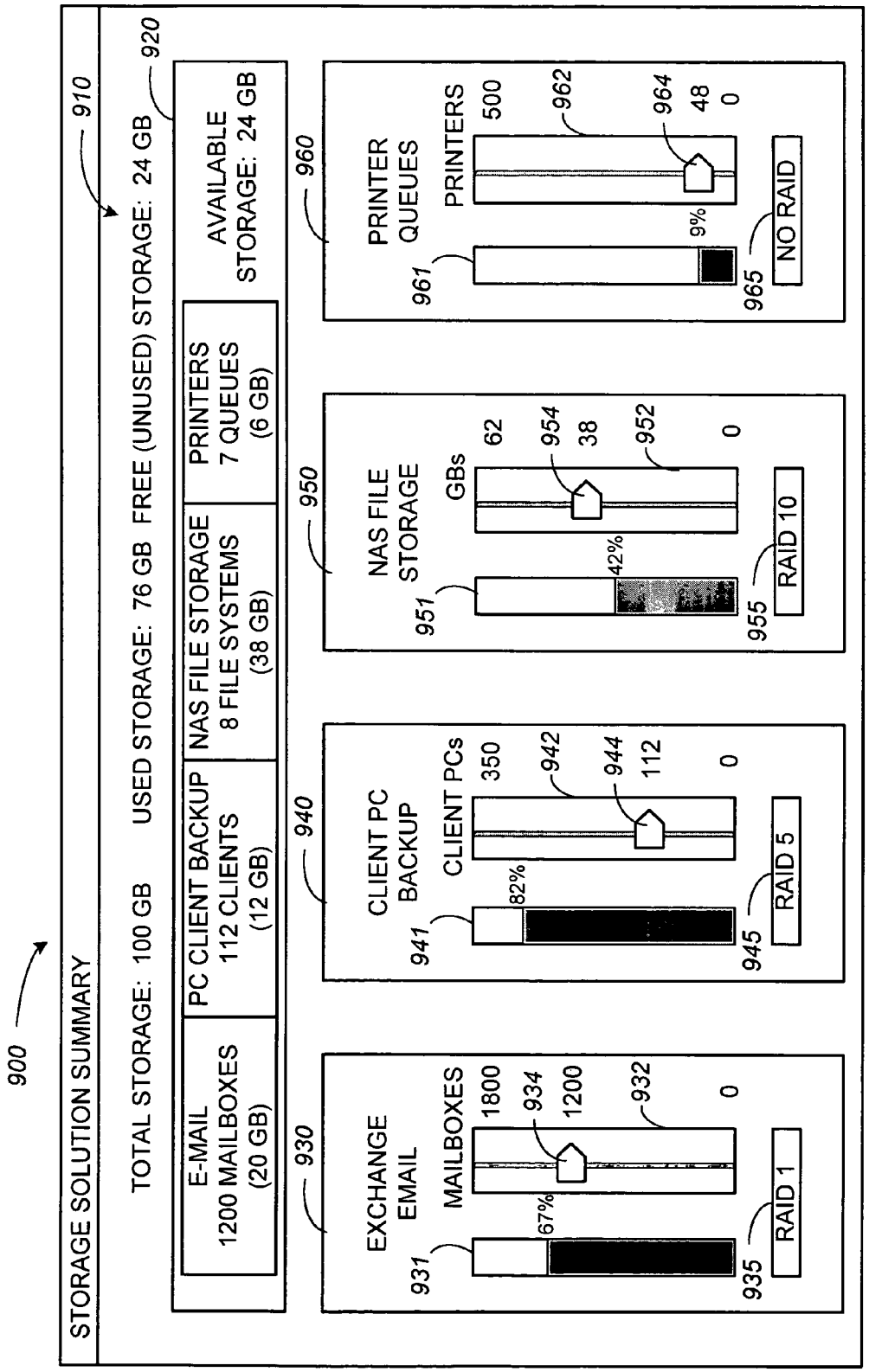
FIG. 9 is a diagram illustrating an alternative embodiment of a graphical user interface generated by the data manager of FIG. 2.

FIG. 9 is a diagram illustrating another alternative embodiment of a graphical user interface generated by the data manager of FIG. 2. Solution based storage interface 900 includes an allocation summary area 910 that lists total storage, used storage and free (unused) storage under the control and management of the data store manager 200. Solution based storage interface 900 also includes an application summary area 920 that reveals total usage of each application that has stored managed data with data store manager 200. The total usage is displayed in both application specific storage units as well as raw storage in bytes. In the illustrated embodiment, applications include email, personal computer (PC) backup, shared file storage, and printer queues.

Solution based storage interface 900 also includes application specific panels that provide a mechanism for monitoring and comparing storage growth across the various applications and a mechanism for adjusting allocated storage space across the applications. For example, exchange email panel 930 includes usage scale 931, which reveals actual data storage usage as a percentage of the allocated space for an exchange email application. Mailbox adjustment scale 932 includes slider 934, which can be manipulated by an operator of the solution based storage interface 900. Adjustment of the slider 934 to increase the number of available mailboxes results in a corresponding decrease of one or more of the storage amounts allocated to the remaining applications. Adjustment of the slider 934 to decrease the number of available mailboxes results in a corresponding increase of one or more of the storage amounts allocated to the remaining applications. Data protection display 935 presents the presently selected and operable raid level being applied to the exchange email data.

Client PC backup panel 940 includes usage scale 941, which reveals actual data storage usage as a percentage of the allocated space for a client PC backup application. PC adjustment scale 942 includes slider 944, which can be manipulated by an operator of the solution based storage interface 900. Adjustment of the slider 944 to increase the number of PCs to backup results in a corresponding decrease of one or more of the storage amounts allocated to the remaining applications. Adjustment of the slider 944 to decrease the number of PCs to backup results in a corresponding increase of one or more of the storage amounts allocated to the remaining applications. Data protection display 945 presents the presently selected and operable raid level being applied to the backed up data.

File share panel 950 (i.e., NAS file storage) includes usage scale 951, which reveals actual data storage usage as a percentage of the allocated space for a file share stored and managed by the data storage manager 200. File share adjustment scale 952 includes slider 954, which can be manipulated by an operator of the solution based storage interface 900. Adjustment of the slider 954 to increase the number of PCs to backup results in a corresponding decrease of one or more of the storage amounts allocated to the remaining applications. Adjustment of the slider 954 to decrease the number of PCs to backup results in a corresponding increase of one or more of the storage amounts allocated to the remaining applications. Data protection display 955 presents the selected and operable raid level being applied to the file share data.

Printer queue panel 960 includes usage scale 961, which reveals actual data storage usage as a percentage of the allocated space for a plurality of printer device queues managed by the data storage manager 200. Printer adjustment scale 962 includes slider 964, which can be manipulated by an operator of the solution based storage interface 900. Adjustment of the slider 964 to increase the number of printer queues results in a corresponding decrease of one or more of the storage amounts allocated to the remaining applications. Adjustment of the slider 964 to decrease the number of printer queues results in a corresponding increase of one or more of the storage amounts allocated to the remaining applications. Data protection display 965 presents the selected and operable raid level being applied to the data in the printer queues.

Figure 10:
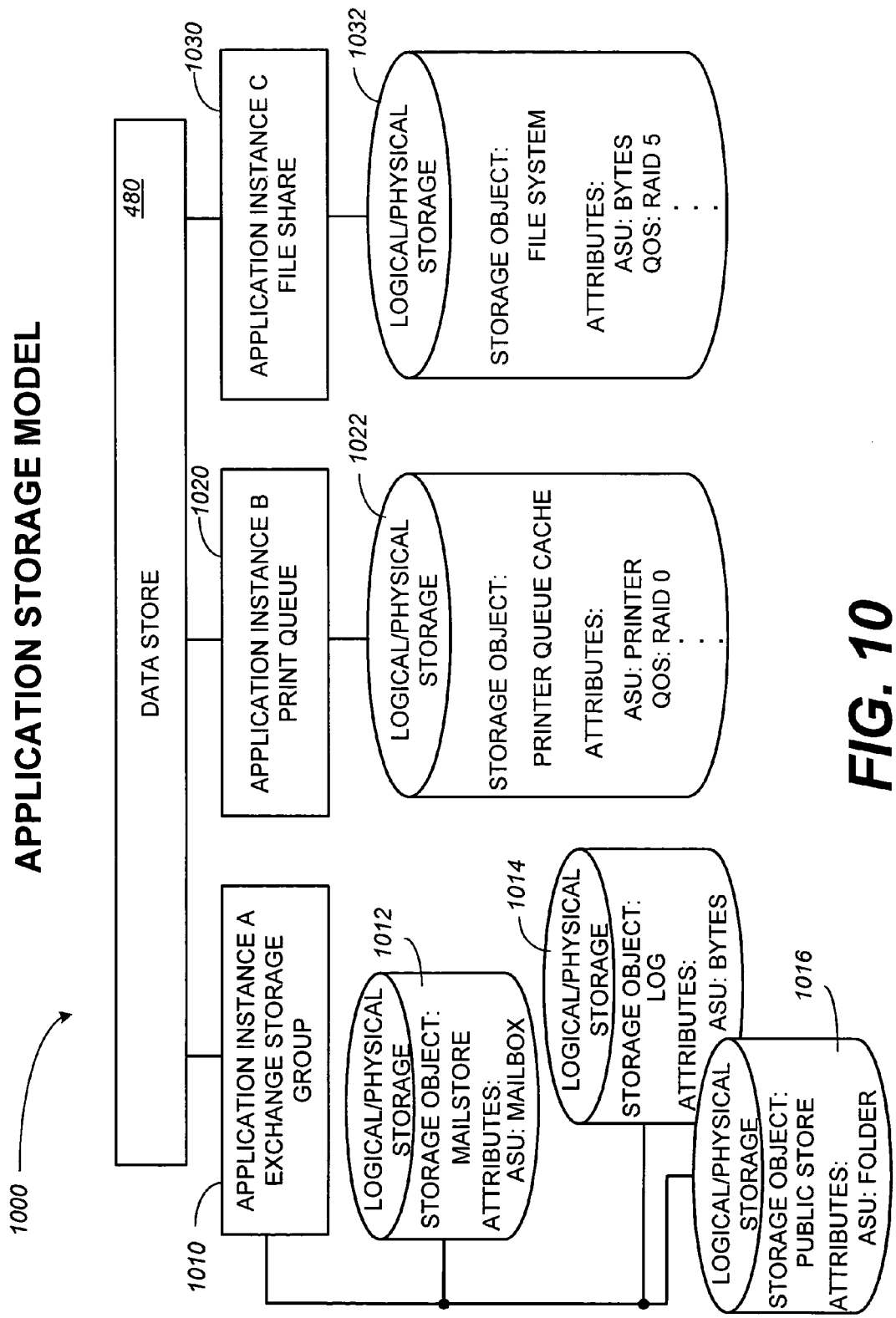
FIG. 10 is a diagram illustrating an alternative embodiment of an application storage model used by the data manager of FIG. 2.

FIG. 10 is a diagram illustrating an alternative embodiment of an application storage model used by the data storage manager 200 of FIG. 2. Application storage model 1000 illustrates how multiple application instances are stored within data store 480. Application storage instance A 1010 includes an Exchange storage group that is distributed across three separate and distinct logical/physical storage devices. A first logical/physical volume 1012 includes a MailStore. The storage object of MailStore is further described by a plurality of attributes including an application storage unit of mailbox. The MailStore includes additional attributes (not shown) such as a quality of service (QOS) level, an average mailbox size, one or more size thresholds, virus scan, backup, and mirror indicators, etc. that describe various levels of service for the data storage manager 200 to apply when performing data operations on the MailStore data. A second logical/physical volume 1014 includes an Exchange Log. The storage object of log is further described by a plurality of attributes including an application storage unit of a byte. The Log may include additional attributes (not shown) such as a QOS level, one or more size thresholds, backup and mirror indicators, etc. that describe various levels of service for the data storage manager 200 to apply when performing data operations on the Log data. A third logical/physical volume 1016 includes an Exchange Public Store. The storage object of Public Store is further described by a plurality of attributes including an application storage unit of a folder. The Public Store may include additional attributes (not shown) such as an average folder size, a QOS level, one or more size thresholds, backup and mirror indicators, etc. that describe various levels of service for the data storage manager 200 to apply when performing data operations on the Public Store data.

Application storage instance B 1020 includes a print server queue that is stored on a single logical/physical storage device 1022. The application storage instance B 1020 includes a storage object of printer queue cache. The printer queue cache is further described by a plurality of attributes including an application storage unit of printer. The printer queue cache includes additional attributes such as a QOS level (e.g., RAID 0), an average print queue size, and one or more size thresholds, etc. (not shown) that describe various levels of service for the data storage manager 200 to apply when performing data operations on the print queue data.

Application storage instance C 1030 includes a file sharer that is stored on a single logical/physical storage device 1032. The application storage instance B 1030 includes a storage object of a file system. The file system is further described by a plurality of attributes including an application storage unit of bytes. The file system includes additional attributes such as a data security level (e.g., RAID 5), an average folder size, one or more size thresholds, etc. (not shown) that describe various levels of service for the data storage manager 200 to apply when performing data operations on the file system data.

Figure 11:
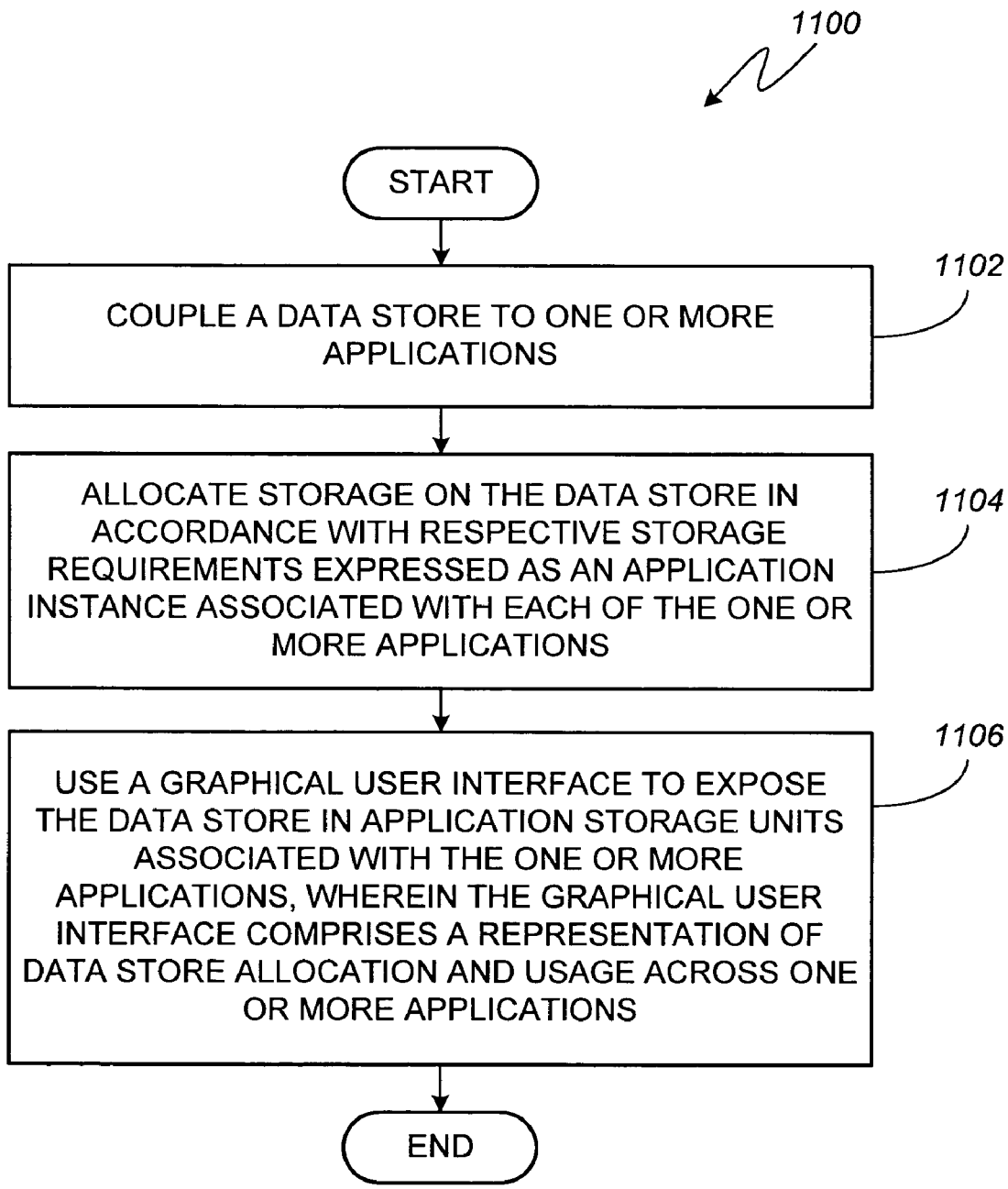
FIG. 11 is a flow diagram illustrating an embodiment of a method for presenting managed data.

FIG. 11 is a flow diagram illustrating an embodiment of a method for presenting managed data. As illustrated, method 1100 begins with block 1102 where a data store is coupled to one or more applications. Thereafter, as indicated in block 1104, storage is allocated on the data store in accordance with respective data storage requirements expressed as an application instance associated with each of the one or more applications. A data storage manager then exposes the data store in application storage units associated with the one or more applications via a graphical user interface that includes a representation of data store allocation and usage across the one or more applications as shown in block 1106.

Figure 12:
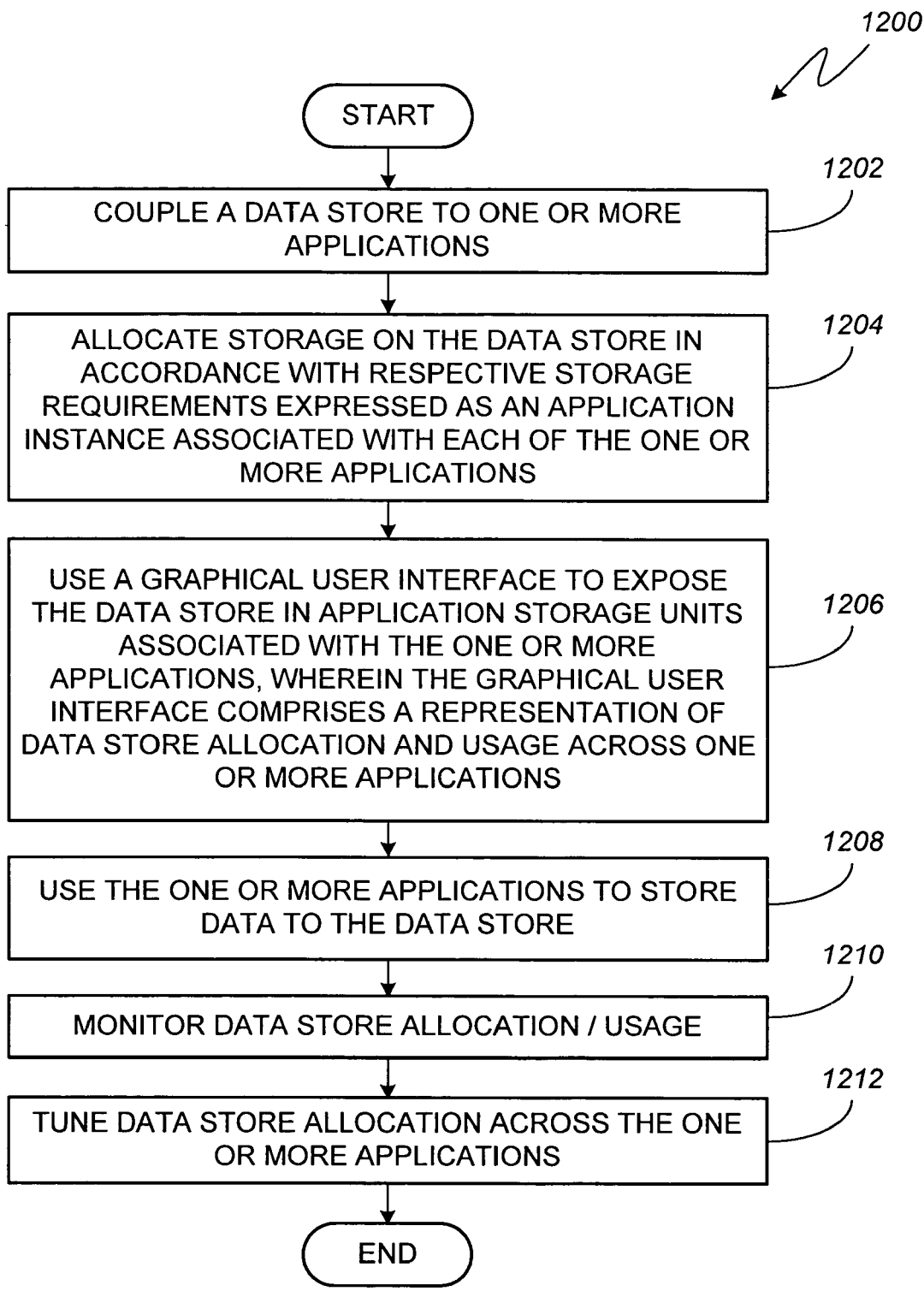
FIG. 12 is a flow diagram illustrating an alternative embodiment of a method for presenting managed data.

FIG. 12 is a flow diagram illustrating an alternative embodiment of a method for managing data. Method 1200 begins with block 1202 where one or more applications are coupled to a data store. Thereafter, as indicated in block 1204, storage is allocated on the data store in accordance with respective data storage requirements expressed as an application instance associated with each of the one or more applications. A data storage manager then exposes the data store in application storage units associated with the one or more applications via a graphical user interface that includes a representation of data store allocation and usage across the one or more applications as shown in block 1206.

Once the data store is integrated with the one or more applications, method 1200 continues as indicated by block 1208 with the one or more applications storing data to the data store. Thereafter, data store utilization is monitored as indicated in block 1210. Data store monitoring may include observation of select allocated portions of the data store designated for storage by one or more applications communicatively coupled to the data store. In addition, data store allocation is tuned or otherwise adjusted across the one or more applications using the data store as shown in block 1212. Data store tuning may be responsive to user inputs and/or may be automated based on a knowledge base that includes optimized storage structure sizes and schemes associated with the one or more applications.

Figure 13:
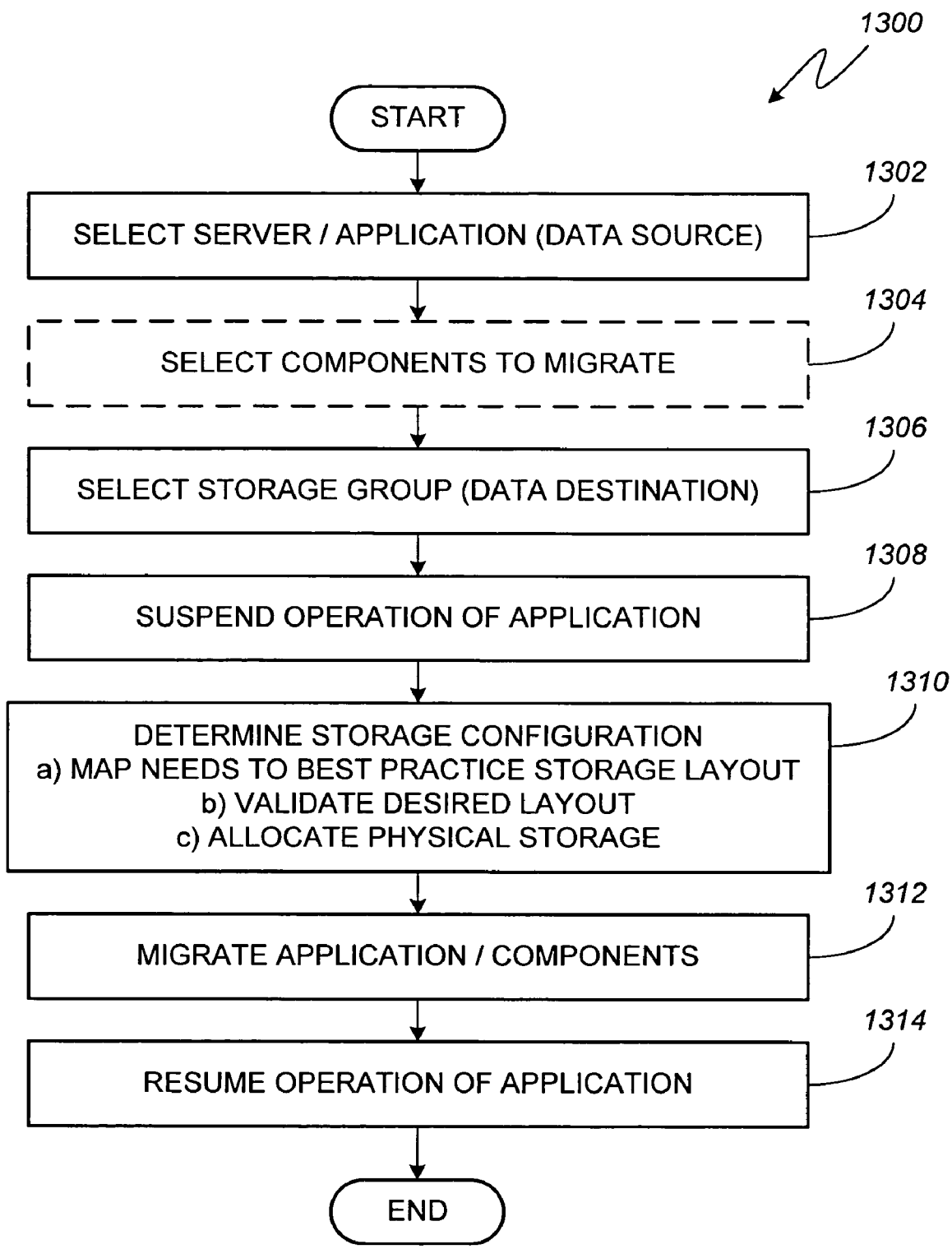
FIG. 13 is a flow diagram illustrating an embodiment of a method for migrating existing data to a data store under the control of the data manager of FIG. 2.

FIG. 13 is a flow diagram illustrating an embodiment of a method for migrating existing data to a data store under the control of the data manager of FIG. 2. Method 1300 begins with block 1302 where a select server/application is chosen as a data source. Thereafter or substantially simultaneously with block 1302 various data components may be optionally selected to migrate to the data store as indicated in block 1304. In block 1306 a storage group or data destination within the managed data of the data store is identified. Operation of the server/application is suspended as indicated in block 1308. Next, as illustrated in block 1310, an optimal storage configuration is determined by mapping data requirements to a best practice storage layout, validating the desired layout, and allocating the physical storage. Once the data store has been prepared, the data identified in blocks 1302 and possibly 1304 are migrated to the data store as shown in block 1312. Once the identified data has been successfully migrated to the data store, operation of the server/application is resumed as indicated in block 1314. Any data and/or select data components that need to be stored in accordance with normal operation of the server/application can then be stored to the data store.

Figure 14:
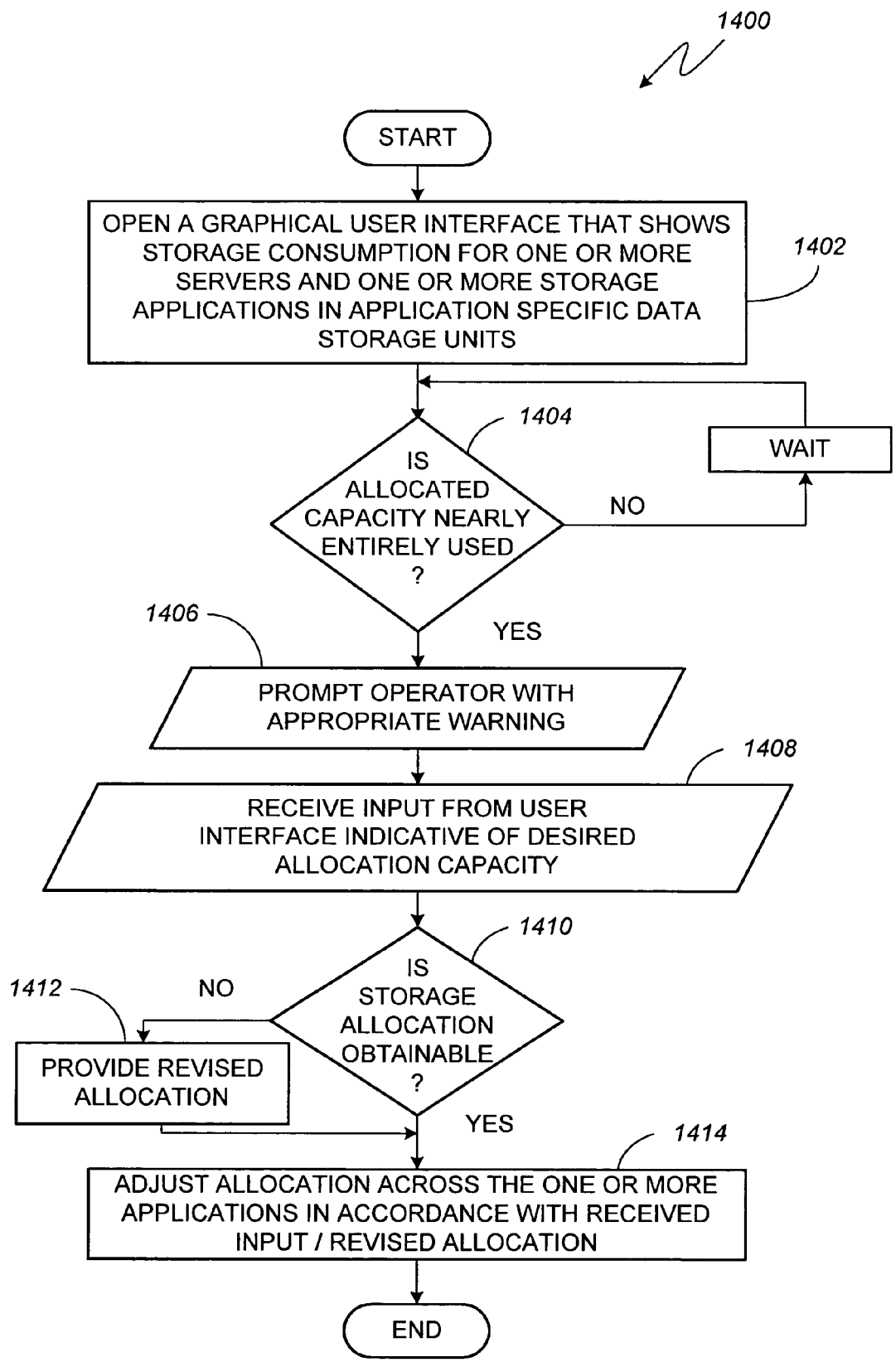
FIG. 14 is a flow diagram illustrating an embodiment of a method for managing storage consumption on a data store under the control of the data manager of FIG. 2.

FIG. 14 is a flow diagram illustrating an embodiment of a method for managing storage consumption on a data store under the control of the data manager of FIG. 2. Method 1400 begins with block 1402 where a graphical user interface is presented that shows storage consumption for one or more storage applications in application specific data storage units. Next, as indicated in decision block 1404, a determination is made concerning the status of allocated storage. When storage capacity exists, as may be determined when the storage capacity has not reached or exceeded a threshold value, as indicated by the flow control arrow labeled "NO," exiting decision block 1404, method 1400 repeats the test illustrated in decision block 1404 after an appropriate period of time. When storage capacity is nearly entirely used as may be determined when the data store reaches or exceeds a threshold value, as indicated by the flow control arrow labeled "YES" exiting block 1404, an operator of the data store manager 200 is prompted with a warning message as shown in input/output block 1406. Method 1400 continues by waiting for an input indicative of a desired allocation capacity as indicated in input/output block 1408. Once an input is received, the data storage manager 200 determines if the desired storage allocation is obtainable as shown by decision block 1410. When it is determined that the desired storage allocation is not obtainable as indicated by the flow control arrow labeled "NO" exiting decision block 1412, a revised allocation is generated, as shown in block 1414 and processing continues with the functionality illustrated in block 1416. Otherwise, when the desired storage allocation is obtainable, as indicated by the flow control arrow labeled "YES" exiting decision block 1412, method 1400 adjusts data storage allocation across the one or more applications in accordance with the received allocation as shown in block 1416.

Any process descriptions or blocks in the flow diagrams presented in FIGS. 11-14 should be understood to represent modules, segments, or portions of code or logic, which include one or more executable instructions for implementing specific logical functions or steps in the associated process. Alternate implementations are included within the scope of the present system in which functions may be executed out of order from that shown or discussed, including substantially concurrently or in reverse order, depending on the functionality involved, as would be understood by those reasonably skilled in the art after having become familiar with the teachings of the present systems and methods for data storage management.

What is claimed is:

1. A data storage management system, comprising:
a data store;
a data storage manager communicatively coupled to the data store and configured to allocate and use logical and physical storage elements of the data store via an application instance that defines a set of areas within the data store that are used by an application specific storage solution; and
a graphical user interface that exposes data storage in the data store in application specific storage units and raw storage units, wherein an application specific storage unit is expressed in terms specific to an application using the data being stored such that different types of applications have different terms used to express application specific storage units, wherein the graphical user interface comprises a representation illustrating data store allocation across two or more applications, wherein the representation comprises an adjustable slider associated with each of the two or more applications, the slider configured to modify the allocated storage for each of the two or more applications, and wherein adjusting a first adjustable slider to cause adjustment of allocated storage expressed in application specific storage units for a first application also causes allocated storage expressed in application specific storage units for one or more other applications to be adjusted accordingly.

2. The system of claim 1, wherein the representation comprises a summary of utilized storage across the two or more applications.

3. The system of claim 1, wherein when one of the adjustable sliders is adjusted the amount of data storage available to the remaining applications is updated accordingly.

4. The system of claim 1, wherein the representation is to illustrate utilized storage associated with applications selected from a group comprising email, file sharing, print serving, and backup applications.

5. The system of claim 4, wherein when the application is configured to store email, the application specific data-storage unit comprises a mailbox.

6. The system of claim 4, wherein when the application is configured to store backup data, the application specific data-storage unit comprises a client.

7. The system of claim 4, wherein when the application is configured to store files, the application specific data-storage unit comprises a byte.

8. The system of claim 4, wherein when the application is configured to store print jobs, the application specific data-storage unit comprises a print queue.

9. The system of claim 1, wherein the graphical user interface maps raw storage to the application specific data storage unit and presents security and services options.

10. The system of claim 1, wherein the application instance comprises attributes that define data management operations to be applied to the network accessible data store.

11. A method for presenting managed data, comprising:
coupling a data store to two or more applications;
allocating storage on the data store in accordance with respective storage requirements expressed as an application instance associated with each of the two or more applications; and
using a graphical user interface to expose the data store in application storage units associated with the two or more applications and raw storage units, wherein an application specific storage unit is expressed in terms specific to an application using the data being stored such that different types of applications have different terms used to express application specific storage units, the graphical user interface comprising a representation illustrating data store allocation and usage across two or more applications, the graphical user interface to present adjustable graphical inputs associated with the two or more applications to enable modification of the allocated storage for each of the two or more applications, and wherein adjusting a first graphical input to cause adjustment of allocated storage expressed in application specific storage units for a first application also causes allocated storage expressed in application specific storage units for one or more other applications to be adjusted accordingly.

12. The method of claim 11, further comprising:
monitoring data store allocation across the two or more applications.

13. The method of claim 12, wherein monitoring comprises observing data assigned to an application instance.

14. The method of claim 12, wherein monitoring comprises assigning a size limit to application data.

15. The method of claim 12, wherein monitoring comprises assigning multiple size limits, wherein at least a first size limit is advisory and at least a second size limit is enforced.

16. The method of claim 11, wherein coupling comprises communicating between a service module that exposes the data store and an agent that exposes the two or more applications.

17. The method of claim 11, wherein allocating storage on the data store comprises assigning attributes with the application instance associated with each of the two or more applications, the attributes defining data management operations.

18. The method of claim 17, wherein the data management operations comprise at least one of quality of service, a backup policy, and a remote mirror.

19. A data manager stored in a physical computer-readable storage medium and executed by one or more processors, comprising:
means for allocating data storage responsive to respective storage needs of one or more applications;
means for exposing the allocated data storage in terms of an application specific storage unit and a raw storage unit, wherein the application specific storage unit is expressed in terms specific to an application using the data being stored such that different types of applications have different terms used to express application specific storage units; and
means for monitoring data storage utilization across a data store responsive to the one or more applications, wherein at least one of said means for allocating, exposing, and monitoring comprises:
a visually observable summary of data store status; and
a visually observable and adjustable graphical input associated with a first one of the one or more applications to modify a first allocated storage expressed in application specific storage units for the first one of the one or more applications and to cause a corresponding modification of a second allocated storage expressed in application specific storage units for a second one of the one or more applications.

20. The data manager of claim 19, wherein said means for exposing comprises at least one application specific storage unit selected from a group comprising an electronic mail box, a logical drive and one or more data folders organized thereunder, a printing device queue, and a table with one or more records organized therein.

21. The data manager of claim 20, wherein the at least one application specific storage unit comprises model instances in a persistent data store.

22. A data storage management system embodied in a physical computer-readable storage medium that when executed by one or more processors exposes one or more application instances, comprising:
a services module configured to communicate with a data store and configured to enable data management operations selected from a group comprising backup, restore, and mirroring to application data on the data store;
an application agent configured to communicate with the services module and store data components associated with applications; and
a data storage manager communicatively coupled to the services module and the application agent, the data storage manager configured to allocate and use logical and physical storage elements of the data store via an application instance that graphically exposes data storage in application specific storage units and raw storage units, wherein an application specific storage unit is expressed in terms specific to an application using the data being stored such that different types of applications have different terms used to express application specific storage units, wherein the data store manager comprises a graphical user interface illustrating data store allocation across two or more applications, wherein the graphical user interface represents utilized storage across the two or more applications, wherein the graphical user interface represents an adjustable slider associated with each of the two or more applications, each slider configured to control the allocated storage for a respective one of the two or more applications, and wherein adjusting a first one of the adjustable sliders to cause adjustment of allocated storage expressed in application specific storage units for a first application also causes allocated storage expressed in application specific storage units for one or more other applications to be adjusted accordingly.

23. The system of claim 22, wherein the application instance defines a set of areas within the network accessible data store that are used by an application operative on a computing device coupled to the data store and the data storage manager.

24. The system of claim 22, wherein the application agent is operative to store data components associated with applications selected from a group comprising email, file sharing, print serving, and backup applications.

25. The system of claim 22, wherein a data storage manager monitors an application's data storage size relative to other data hosted on the data store.

26. The system of claim 22, wherein the application instance comprises attributes that define data management operations to be applied to the data store.

27. The system of claim 26, wherein the data management operations comprise at least one of quality of service, a backup policy, and a remote mirror.

28. The system of claim 22, wherein when one of the adjustable sliders is adjusted the amount of data storage available to the remaining applications is updated accordingly.

29. The system of claim 22, wherein the graphical user interface comprises a representation illustrating utilized storage associated with applications selected from a group comprising email, file sharing, print serving, and backup applications.

30. The system of claim 22, wherein the graphical user interface maps raw storage to the application specific data storage unit and presents security and services options.

31. A method for migrating data to a managed data store, comprising:
selecting a data source associated with a data storage application;
selecting a data destination;
suspending operation of the data storage application;
determining a storage configuration by automatically mapping a best practice storage layout responsive to the data storage application, overriding at least a portion of the best practice storage layout with a user configuration, validating the storage layout, and when validated, allocating a desired data area within the data destination using a graphical user interface to expose the data store in application storage units associated with two or more applications and raw storage units, wherein an application specific storage unit is expressed in terms specific to an application using the data being stored such that different types of applications have different terms used to express application specific storage units, the graphical user interface comprising a representation illustrating data store allocation and usage across two or more applications, the graphical user interface to present adjustable graphical inputs associated with the two or more applications to enable modification of the allocated storage for each of the two or more applications, wherein adjusting a first graphical input to cause adjustment of allocated storage expressed in application specific storage units for a first application also causes allocated storage expressed in application specific storage units for one or more other applications to be adjusted accordingly;
migrating data from the data source to the desired data area within the data destination; and
resuming operation of the data storage application.

32. The method of claim 31, wherein determining a storage configuration comprises a best practice storage layout comprising at least one of a storage array type, volume, and RAID level.

33. The method of claim 31, wherein determining a storage configuration comprises validating the storage layout by communicating with one or more physical storage managers.

34. A method for managing a data store, comprising:
presenting storage consumption for one or more servers and two or more data storage applications in application specific data storage units and raw storage units, wherein an application specific storage unit is expressed in terms specific to an application using the data being stored such that different types of applications have different terms used to express application specific storage units, wherein presenting storage consumption comprises using a graphical user interface to expose the data store in application storage units associated with two or more applications and raw storage units, wherein an application specific storage unit is expressed in terms specific to an application using the data being stored such that different types of applications have different terms used to express application specific storage units, the graphical user interface comprising a representation illustrating data store allocation and usage across two or more applications, the graphical user interface to present adjustable graphical inputs associated with the two or more applications to enable modification of the allocated storage for each of the two or more applications, wherein adjusting a first graphical input to cause adjustment of allocated storage expressed in application specific storage units for a first application also causes allocated storage expressed in application specific storage units for one or more other applications to be adjusted accordingly;
determining when data storage location usage has reached a threshold across the one or more servers and two or more applications;
when data storage location usage has reached the threshold, issuing a warning message and waiting for an input indicative of a desired allocation capacity, otherwise waiting a time and repeating;
receiving an input indicative of a desired allocation capacity;
determining if the desired allocation capacity can be obtained;
when the desired allocation capacity cannot be obtained, adjusting the desired allocation capacity to generate a verified allocation capacity, otherwise using the desired allocation capacity as the verified allocation capacity; and
adjusting the allocation capacity in accordance with the verified allocation capacity.

35. The method of claim 11, wherein at least one of the adjustable graphical inputs comprises an adjustable slider.

36. The data manager of claim 19, wherein the visually observable and adjustable graphical input comprises an adjustable slider.

37. The data manager of claim 19, wherein when the visually observable and adjustable graphical input is adjustable to increase the first allocated storage for the first one of the one or more applications, the visually observable and adjustable graphical input is to cause a corresponding decrease in the second allocated storage for the second one of the one or more applications; and when the visually observable and adjustable graphical input is adjusted to decrease the first allocated storage for the first one of the one or more applications, the visually observable and adjustable graphical input is to cause a corresponding increase in the second allocated storage for the second one of the one or more applications.

38. The method of claim 31, further comprising iteratively mapping an alternative storage layout responsive to the data storage application until a particular alternative storage layout is validated.

39. The method of claim 34, wherein receiving the input indicative of the desired allocation capacity comprises processing adjustable inputs associated with the two or more applications to control a respective portion of the desired allocation capacity allocated to each of the two or more applications.

* * * * *